(12) United States Patent
Sawada et al.

(10) Patent No.: US 11,513,570 B2
(45) Date of Patent: Nov. 29, 2022

(54) IMAGE FORMING SYSTEM INCLUDING OPERATION UNIT

(71) Applicant: CANON KABUSHIKI KAISHA, Tokyo (JP)

(72) Inventors: Hirohisa Sawada, Chiba (JP); Shingo Hattori, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/200,163

(22) Filed: Mar. 12, 2021

(65) Prior Publication Data
US 2021/0289087 A1 Sep. 16, 2021

(30) Foreign Application Priority Data

Mar. 16, 2020 (JP) .............................. JP2020-045743

(51) Int. Cl.
*G03G 15/00* (2006.01)
*H04N 1/00* (2006.01)
(Continued)

(52) U.S. Cl.
CPC ......... *G06F 1/181* (2013.01); *G03G 15/5016* (2013.01); *G03G 21/1647* (2013.01); *G03G 21/1652* (2013.01); *H04N 1/00384* (2013.01); *H04N 1/00411* (2013.01); *H04N 1/00493* (2013.01); *H04N 1/00496* (2013.01)

(58) Field of Classification Search
CPC ........... G03G 15/5016; G03G 21/1619; G03G 21/1647; G03G 21/1652; H04N 1/00384; H04N 1/00411; H04N 1/00493; H04N 1/00496; G06F 1/181; F16M 13/005
See application file for complete search history.

(56) References Cited

U.S. PATENT DOCUMENTS

2006/0171734 A1* 8/2006 Maeda ............... H04N 1/00384
399/81
2012/0305726 A1* 12/2012 Hashimoto ........ G03G 15/5016
248/292.12
(Continued)

FOREIGN PATENT DOCUMENTS

JP H10-264452 A 10/1998
JP 2005-134688 A 5/2005
(Continued)

*Primary Examiner* — Sophia S Chen
(74) *Attorney, Agent, or Firm* — Canon U.S.A., Inc. IP Division

(57) ABSTRACT

An image forming system includes an image forming unit, a housing having a top face, an operation unit freely placed on the housing top face, a touch panel, and a supporting base. The image forming unit forms an image on a sheet. The operation unit is freely placed on the housing top face and accepts a user operation for causing the image forming unit to execute image formation. The operation unit includes a touch panel having a display face on which information about the image formation is displayed and accepting touch operation performed by a user. The supporting base supports the touch panel so that an inclination angle of the display face inclined with respect to the housing top face becomes one of 5 degrees or more and 45 degrees or less when the operation unit is placed on the housing top face.

17 Claims, 18 Drawing Sheets

(51) Int. Cl.
     *G06F 1/18*      (2006.01)
     *G03G 21/16*     (2006.01)

(56)        References Cited

U.S. PATENT DOCUMENTS

2015/0116742 A1*  4/2015  Han ................... H04N 1/00411
                                                        358/1.12
2016/0085200 A1*  3/2016  Fujita ................ G03G 15/5016
                                                         399/90
2017/0255158 A1*  9/2017  Shikata ............... G03G 21/168
2017/0310838 A1* 10/2017  Saito ................. G03G 15/5016
2019/0003222 A1*  1/2019  Taguchi ............. G03G 21/1619
2021/0092246 A1*  3/2021  Moriyama .......... H04N 1/00496
2021/0165354 A1*  6/2021  Watanabe .......... H04N 1/00496

FOREIGN PATENT DOCUMENTS

JP         2010-243977 A       10/2010
JP         2016-062006 A        4/2016

* cited by examiner

IMAGE FORMING SYSTEM INCLUDING OPERATION UNIT

BACKGROUND

Field

The present disclosure relates to an image forming system including an operation unit that can be freely placed on a top face of a housing.

Description of the Related Art

An image forming apparatus such as a copying machine includes an operation unit that allows a user to change an operation mode and to make detailed settings with respect to operations. In a system (image forming system) including an image forming apparatus and optional apparatuses such as a sheet feeding unit, a conveyance unit, and a post-processing unit connected to the image forming apparatus, the user performs setting operation of various optional apparatuses on the operation unit.

In the above-described large-size image forming system having a long length and including a plurality of optional apparatuses connected to each other, the user may perform operation on the optional apparatuses at a place away from the image forming apparatus where the operation unit is placed. In this case, it is troublesome to move between these optional apparatuses every time the user performs operation on the optional apparatuses and the operation unit.

Thus, for example, there is provided an operation unit that can be placed not only on the image forming apparatus but also on the optional apparatus (Japanese Patent Laid-Open No. 2010-243977). The operation unit discussed in Japanese Patent Laid-Open No. 2010-243977 includes a display for displaying information to a user, an arm that supports the display, and a supporting base that supports the display via the arm. The display supported by the arm extending from the supporting base forms a predetermined angle with respect to a placement surface on which the supporting base is placed.

However, the display of the operation unit included in the image forming apparatus discussed in Japanese Patent Laid-Open No. 2010-243977 forms an angle of approximately 90 degrees with respect to the placement surface on which the supporting base is placed. Thus, there is a possibility that the display cannot be viewed easily from a high viewpoint. On the other hand, if the display is placed parallel to the placement surface, the display cannot be viewed easily from a low viewpoint.

SUMMARY

According to an aspect of the present disclosure, an image forming system includes an image forming unit configured to form an image on a sheet, a housing having a top face, and an operation unit freely placed on the housing top face and configured to accept a user operation for causing the image forming unit to execute image formation, wherein the operation unit includes, a touch panel having a display face on which information about the image formation is displayed and configured to accept touch operation performed by a user, and a supporting base configured to support the touch panel so that an inclination angle of the display face inclined with respect to the housing top face becomes one of 5 degrees or more and 45 degrees or less when the operation unit is placed on the housing top face.

As described, by setting a display panel included in the operation unit to be at an angle of 5 degrees or more and 45 degrees or less with respect to the placement surface of the operation unit placed on a top face of the image forming apparatus, information displayed on the display panel can be easily viewed from a high viewpoint as well as a low viewpoint.

Further features of the present disclosure will become apparent from the following description of exemplary embodiments with reference to the attached drawings.

DESCRIPTION OF THE EMBODIMENTS

Hereinafter, an image forming system according to the present exemplary embodiment will be described with reference to the drawings. A scope of the present disclosure is not intended to be limited to sizes, materials, shapes, and relative arrangement of the constituent elements described below, unless such specific limitations are described in particular.

<Image Forming Apparatus>

Figure 1:
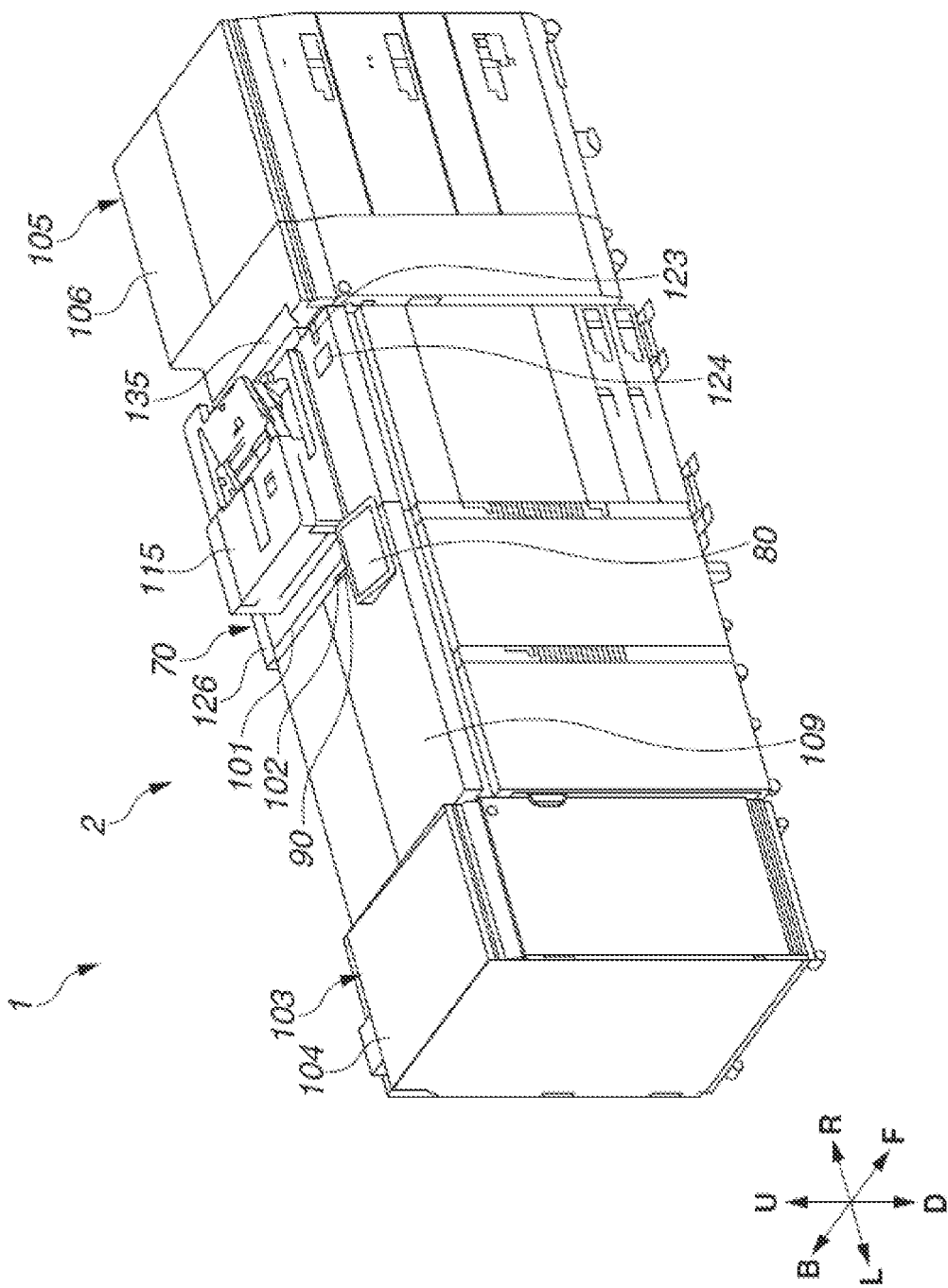
FIG. 1 is a schematic cross-sectional diagram of an image forming system.

Hereinafter, the present exemplary embodiment will be described in detail with reference to the drawings. As illustrated in FIG. 1, in the present exemplary embodiment, a direction toward a front side of an image forming apparatus 2 is referred to as a forward direction F, a depth side (back side) thereof is referred to as a backward direction B, a left side is referred to as a leftward direction L, a right side is referred to as a rightward direction R, an upper side is referred to as an upward direction U, and a lower side is referred to as a downward direction D.

For example, as illustrated in FIG. 1, an image forming system 1 according to the present exemplary embodiment includes an image forming apparatus 2 such as a printer and a post-processing apparatus 103 in which sheets S on which images are formed are stacked. The post-processing apparatus 103 is disposed adjacent to a side in the leftward direction L of the image forming apparatus 2. In the present exemplary embodiment, each of the image forming apparatus 2 and the post-processing apparatus 103 is defined as a housing. A top face 109 that can be used as a work space is provided on a top face of the image forming apparatus 2. In the present exemplary embodiment, a size of the top face 109 is larger than a maximum size (e.g., A3 size) of the sheets S on which the image forming apparatus 2 can execute image formation. For example, a user who uses the image forming system 1 spreads a drawing on the top face 109 to perform drafting work. Thus, the top face 109 is a horizontal surface as flat as possible. Herein, an area indicated by a reference numeral 1010 in FIG. 4 described below is one example of the work space. The work space 1010 is horizontal if the image forming system 1 is installed horizontally. The area is designed so that unevenness such as a groove is eliminated as much as possible except for a connection portion between members that is unavoidably formed because of exterior design of the image forming system 1. Thus, the area constitutes a face as flat as possible. It is sufficient to provide the work space 1010 having an area where at least an A3-size sheet can be spread out, so that a flat face is ensured for that area. In addition, the top face 109 is constituted of a resin plate, for example, and even if there is a certain degree of unavoidable manufacturing unsteadiness or unevenness, the top face 109 is regarded as a flat face. Further, a concept of horizontal herein does not mean horizontal in a strictly mathematical sense, but means horizontal in a practical sense, i.e., substantially horizontal.

In the present exemplary embodiment, a tandem-type full color printer is described as an example of the image forming apparatus 2. However, the present disclosure is applicable not only to the tandem-type image forming apparatus 2 but also to an image forming apparatus of another type. Further, the present disclosure is applicable not only to a full color image forming apparatus but also to a black-and-white or to a monochrome image forming apparatus.

Figure 2:
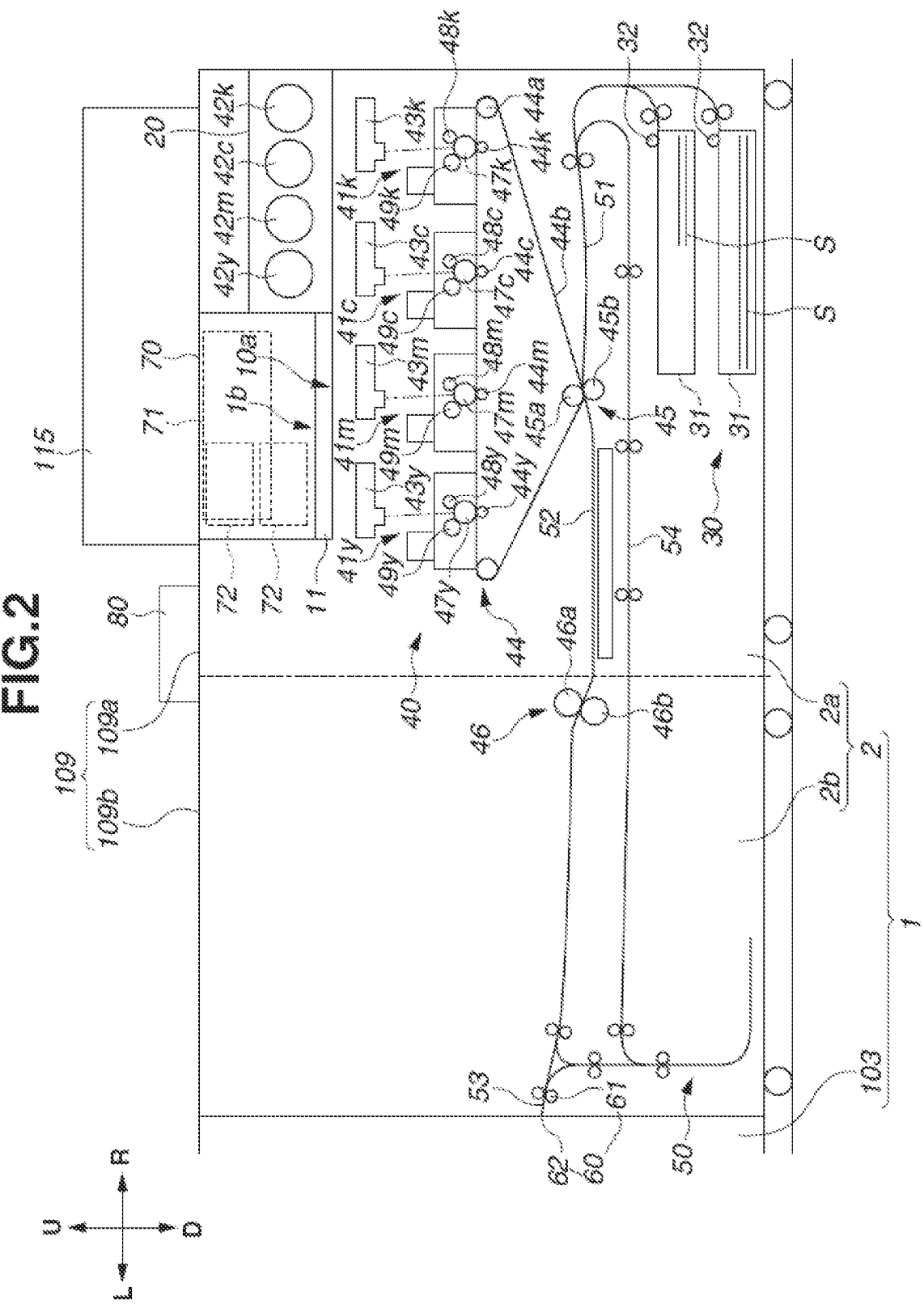
FIG. 2 is a schematic cross-sectional diagram of a part of the image forming system.

As illustrated in FIG. 2, in the present exemplary embodiment, the image forming apparatus 2 as one example of the housing can be divided into two portions, i.e., an image forming unit housing 2a and a conveyance unit housing 2b. The conveyance unit housing 2b conveys a sheet on which image formation is executed by the image forming unit housing 2a to the post-processing apparatus 103 (not illustrated). Each of the image forming unit housing 2a and the conveyance unit housing 2b is also an example of the housing. The image forming unit housing 2a includes a top face 109a, and the conveyance unit housing 2b includes a top face 109b. The image forming unit housing 2a and the conveyance unit housing 2b can be connected to each other, so that the top faces 109a and 109b are connected to constitute the one flat top face 109. As described above, the image forming unit housing 2a and the conveyance unit housing 2b can be connected with and separated from each other. Thus, for example, in a case where the image forming unit housing 2a and the conveyance unit housing 2b are conveyed to an upper floor of a building, each of the housings 2a and 2b can be separately conveyed to a predetermined floor using an elevator. With this configuration, a large-size image forming system 1 having a long length can be easily conveyed to a predetermined floor of the building using an elevator.

The image forming apparatus 2 includes a toner supplying unit 20, a sheet feeding unit 30, an image forming unit 40, a sheet conveyance unit 50, a sheet discharge unit, an electric unit 70, and an operation unit 80. A sheet S is a recording material on which a toner image is formed. Specific examples of the sheet include a normal sheet, a synthetic resin sheet used as a substitute for the normal sheet, a thick sheet, and an overhead projector sheet.

The sheet feeding unit 30 is disposed in a lower part of the image forming apparatus 2. The sheet feeding unit 30 includes a sheet cassette 31 in which the sheets S are stacked and stored and a feeding roller 32. The sheet feeding unit 30 feeds the sheets S to the image forming unit 40.

The image forming unit 40 includes an image forming unit 41, a toner bottle 42, an exposure device 43, an intermediate transfer unit 44, a secondary transfer unit 45, and a fixing device 46, and executes image formation.

The image forming unit 41 includes four image forming units 41y, 41m, 41c, and 41k for forming toner images in four colors of yellow (y), magenta (m), cyan (c), and black (k). Each of the image forming units 41y, 41m, 41c, and 41k can be attached to and detached from the image forming apparatus 2 by the user. For example, the image forming unit 41y includes a photosensitive drum 47y for forming a toner image, a charging roller 48y, a development sleeve 49y, a drum cleaning blade (not illustrated) and toner (not illustrated). Toner is supplied to the image forming unit 41y from a toner bottle 42y filled with toner. The other image forming units 41m, 41c, and 41k have configurations similar to the configuration of the image forming unit 41y except for the color of toner. Thus, detailed description thereof will be omitted.

The exposure device 43y is an exposure unit that exposes a surface of the photosensitive drum 47y with light to form an electrostatic latent image on the surface of the photosensitive drum 47y.

The intermediate transfer unit 44 is disposed at a position in the downward direction D of the image forming unit 41. The intermediate transfer unit 44 includes a plurality of rollers such as a driving roller 44a, primary transfer rollers 44y, 44m, 44c, and 44k, and an intermediate transfer belt 44b stretched around these rollers. The primary transfer rollers 44y, 44m, 44c, and 44k are respectively arranged to face photosensitive drums 47y, 47m, 47c, and 47k to be in contact with the intermediate transfer belt 44b. A transfer bias in a positive polarity is applied to the intermediate transfer belt 44b from the primary transfer rollers 44y, 44m, 44c, and 44k, so that toner images in a negative polarity formed on the respective photosensitive drums 47y, 47m, 47c, and 47k are sequentially multi-transferred to the intermediate transfer belt 44b. With this operation, a full color image is formed on the intermediate transfer belt 44b.

The secondary transfer unit 45 includes a secondary transfer internal roller 45a and a secondary transfer external roller 45b. A secondary transfer bias in a positive polarity is applied to the secondary transfer external roller 45b, so that the full color image formed on the intermediate transfer belt 44b is transferred to the sheet S. The secondary transfer internal roller 45a stretches the intermediate transfer belt 44b on an inner side of the intermediate transfer belt 44b, and the secondary transfer external roller 45b is disposed at a position opposite to the secondary transfer internal roller 45a with the intermediate transfer belt 44b therebetween.

The fixing device 46 includes a fixing roller 46a and a pressure roller 46b. When the sheet S is nipped and conveyed by the fixing roller 46a and the pressure roller 46b, the toner image transferred to the sheet S is pressurized, heated, and fixed onto the sheet S. In the present exemplary embodiment, the conveyance unit housing 2b includes the fixing device 46, but the present exemplary embodiment is not limited thereto. For example, a configuration may be such that the image forming unit housing 2a includes the fixing device 46, whereas the conveyance unit housing 2b does not include the fixing device 46. Naturally, each of the housings 2a and 2b may include the fixing device 46.

The sheet conveyance unit 50 includes a pre-secondary transfer conveyance path 51, a pre-fixing conveyance path 52, a discharge path 53, and a reconveyance path 54, and conveys the sheet S fed from the sheet feeding unit 30 to the sheet discharge unit 60 from the image forming unit 40.

The sheet discharge unit 60 includes a discharge roller pair 61 arranged on a downstream side of the discharge path 53, and a discharge port 62 arranged on a side face of the image forming apparatus 2 in the leftward direction L. The discharge roller pair 61 feeds the sheet S to be conveyed on the discharge path 53 from the nip portion to the discharge port 62 to discharge the sheet S therefrom. The sheet S discharged from the discharge port 62 can be fed to the post-processing apparatus 103 disposed adjacent to the image forming apparatus 2 in the leftward direction L.

Figure 3:
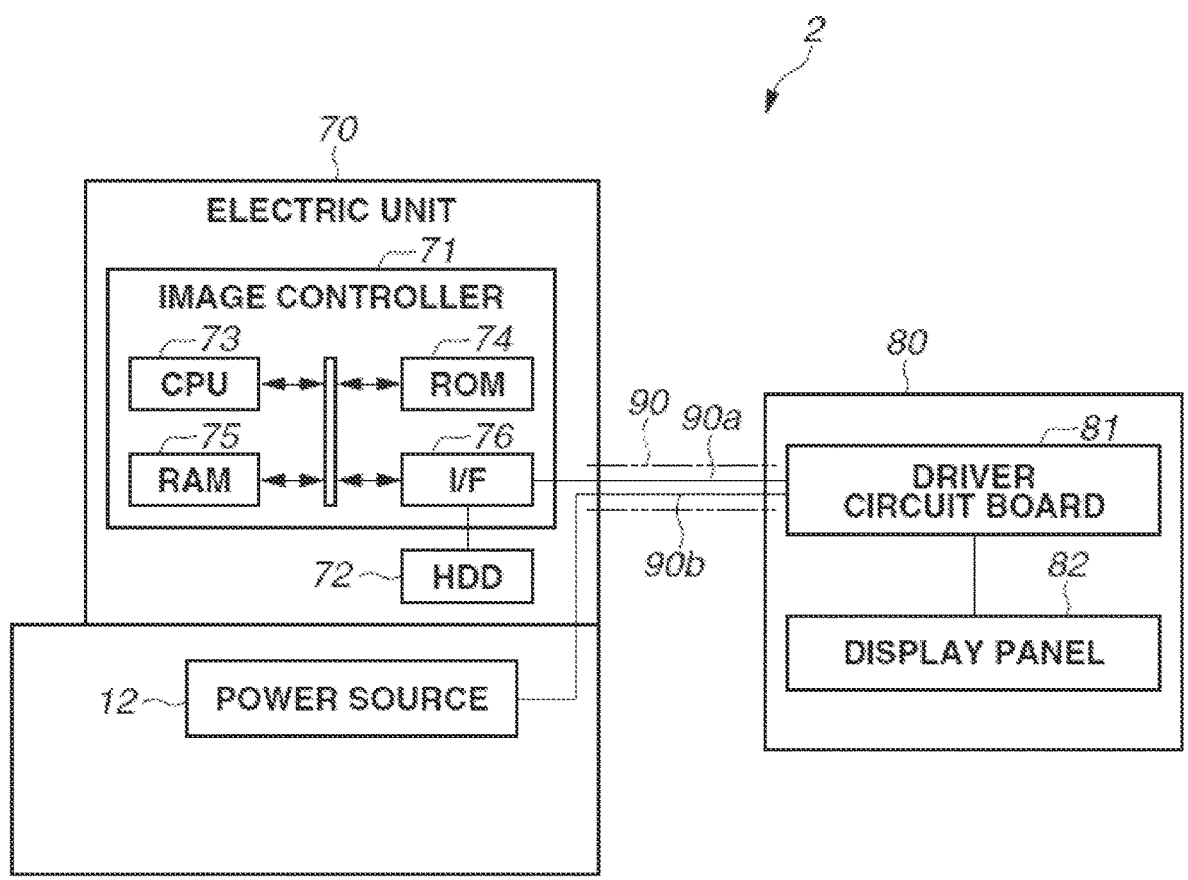
FIG. 3 is a block diagram illustrating a configuration for controlling an operation unit through the image forming system.

As illustrated in FIG. 3, the electric unit 70 includes an image controller 71 as a control circuit board including a control unit and a hard disk drive (hereinafter referred to as a HDD) 72 as a removable large-capacity storage device. The image controller 71 is constituted of a computer, and includes, for example, a central processing unit (CPU) 73, a read only memory (ROM) 74 for storing a program for controlling the units, a random access memory (RAM) 75 for temporarily storing data, and an input-output circuit (interface (I/F)) 76 for receiving and transmitting a signal from and to an external unit. The HDD 72 is a removable large-capacity storage device for saving electronic data, and can mainly store an image processing program, digital image data, and supplemental information about the digital image data. When image formation is executed, image data is read from the HDD 72.

The CPU 73 is a microprocessor responsible for overall control of the image forming apparatus 2. The CPU 73 is a main constituent element of the image controller 71. The CPU 73 is connected with the sheet feeding unit 30, the image forming unit 40, the sheet conveyance unit 50, the sheet discharge unit 60, the HDD 72, and the operation unit 80 via the input-output circuit (I/F) 76, and exchanges signals with these units and controls operation thereof. The image controller 71 allows a user to operate the image forming apparatus 2 and make settings thereof by inputting an instruction via a computer (not illustrated) connected to the image forming apparatus 2 or by operating the operation unit 80.

The operation unit 80 is provided separately from the image forming apparatus 2, and the units of the image forming apparatus 2 can be operated by using the operation unit 80. The operation unit 80 includes a driver circuit board 81 and a display panel 82. The display panel 82 displays information necessary for the user to operate the image forming apparatus 2, such as a remaining amount of sheets S and a remaining amount of toner that are supplied to the image forming apparatus 2, a warning message indicating such consumable supplies have been consumed, and a procedure for supplying the consumable supplies. The display panel 82 accepts inputs of user operation with regard to a size and a bases weight of the sheet S, an adjustment of image density, and a setting of the number of output sheets.

The operation unit 80 is connected to the electric unit 70 of the image forming apparatus 2 via a cable 90 and thus can receive power supplied therefrom. The cable 90 is a bundle wire consisting of a signal line 90a and a power line 90b. Alternatively, the signal line 90a and the power line 90b can be provided as separate cables. The signal line 90a connects the input-output circuit (I/F) 76 of the image controller 71 and the driver circuit board 81, and the power line 90b connects a power source 12 of the image forming apparatus 2 and the driver circuit board 81.

Subsequently, image forming operation executed by the image forming apparatus 2 configured as the above will be described.

When the image forming operation is started, firstly, the photosensitive drums 47y, 47m, 47c, and 47k are rotated, and surfaces thereof are charged by charging rollers 48y, 48m, 48c, and 48k. Then, exposure devices 43y, 43m, 43c, and 43k emit laser light based on image information to irradiate the photosensitive drums 47y, 47m, 47c, and 47k with laser light, so that electrostatic latent images are formed on the surfaces of the photosensitive drums 47y, 47m, 47c, and 47k. Then, toner is adhered to the electrostatic latent images, so that the electrostatic latent images are developed and visualized as toner images and transferred to the intermediate transfer belt 44b.

Concurrently with the above-described operation for forming the toner images, the feeding roller 32 rotates to separate and feed an uppermost sheet S from the sheet cassette 31. Then, the sheet S is conveyed to the secondary transfer unit 45 via the pre-secondary transfer conveyance path 51 while adjusting a timing with that of the toner image on the intermediate transfer belt 44b. The image is further transferred to the sheet S from the intermediate transfer belt 44b, and the sheet S is conveyed to the fixing device 46. In the fixing device 46, the unfixed toner image is heated, pressurized, and fixed onto the surface of the sheet S. Then, the sheet S is discharged from the discharge port 62 by the discharge roller pair 61 and supplied to the post-processing apparatus 103.

<Operation Unit>

The operation unit 80 which the user uses to operate the image forming system 1 is connected to the electric unit 70 via the cable 90. The electric unit 70 is disposed on a back face of the image forming apparatus 2, and a connector (not illustrated) provided at one end of the cable 90 is connected to the electric unit 70. The cable 90 transmits a control signal for controlling the operation unit 80 to the operation unit 80 from the electric unit 70. The cable 90 functions to communicably connect between the image forming apparatus 2 and the operation unit 80. Another end of the cable 90 is connected to the operation unit 80. As described above, the operation unit 80 is connected to the image forming apparatus 2 via the cable 90, and is not fixed to the top face 109. Thus, the user can freely place the operation unit 80 at an arbitrary position on the top face 109 if the position is within a range of a cable length of the cable 90. Herein, the operation unit 80 being freely placed refers to a state where the operation unit 80 is not fixed to the top face 109 with a screw, i.e., a state where a placement position of the operation unit 80 on the top face 109 can be freely changed. However, a place where the operation unit 80 can be fixed with a screw or a magnet can also be provided on the top face 109. Thus, it is up to the user whether the user uses the operation unit 80 in a state where the operation unit 80 is fixed to that place. In this way, the user can freely place the operation unit 80 on the top face 109 when the screw is removed therefrom.

Figure 4:
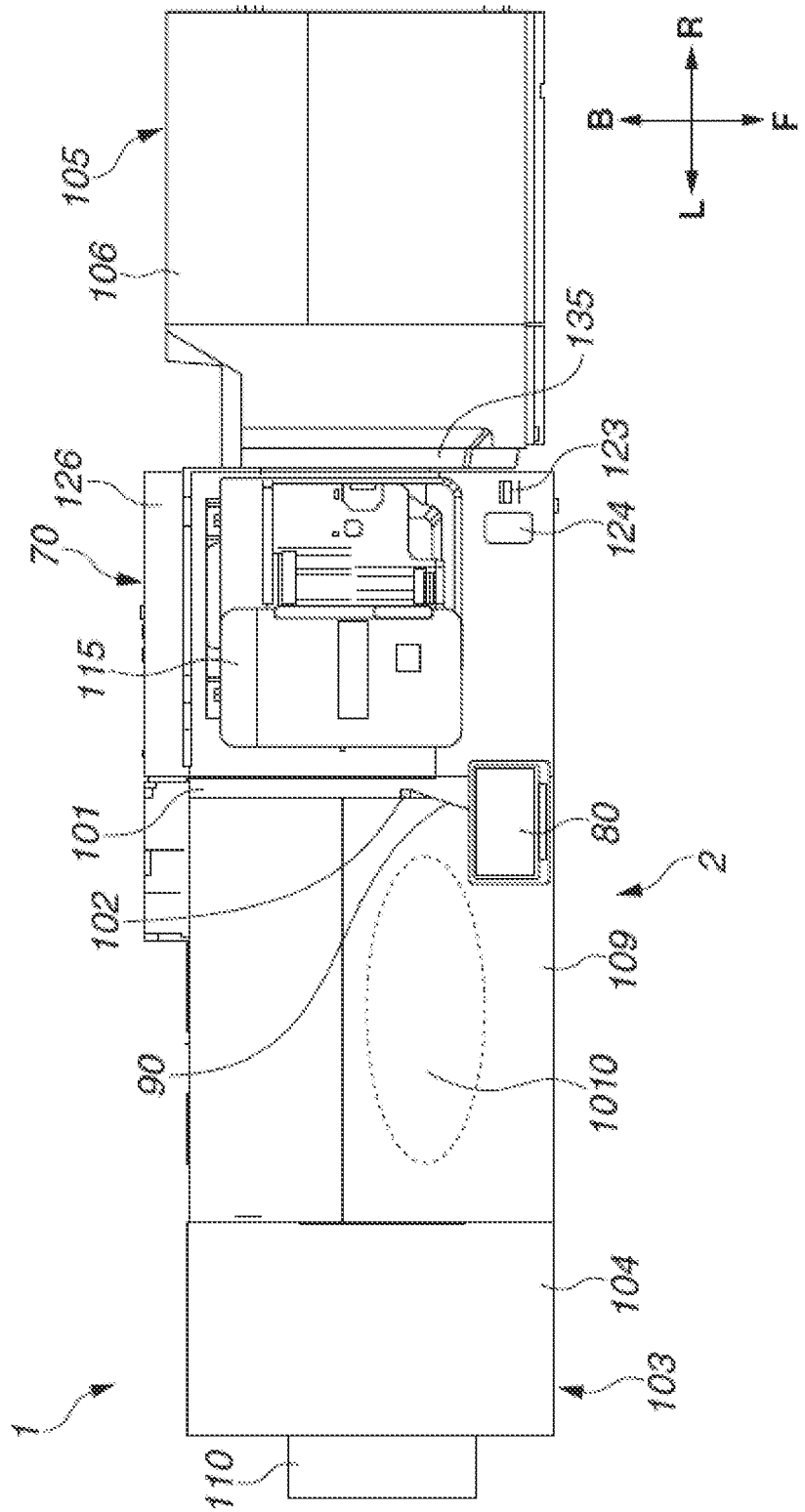
FIG. 4 is a diagram illustrating a state where the operation unit is placed on a top face on a left side of a reading apparatus, from among top faces of housings included in the image forming system.
Figure 5:
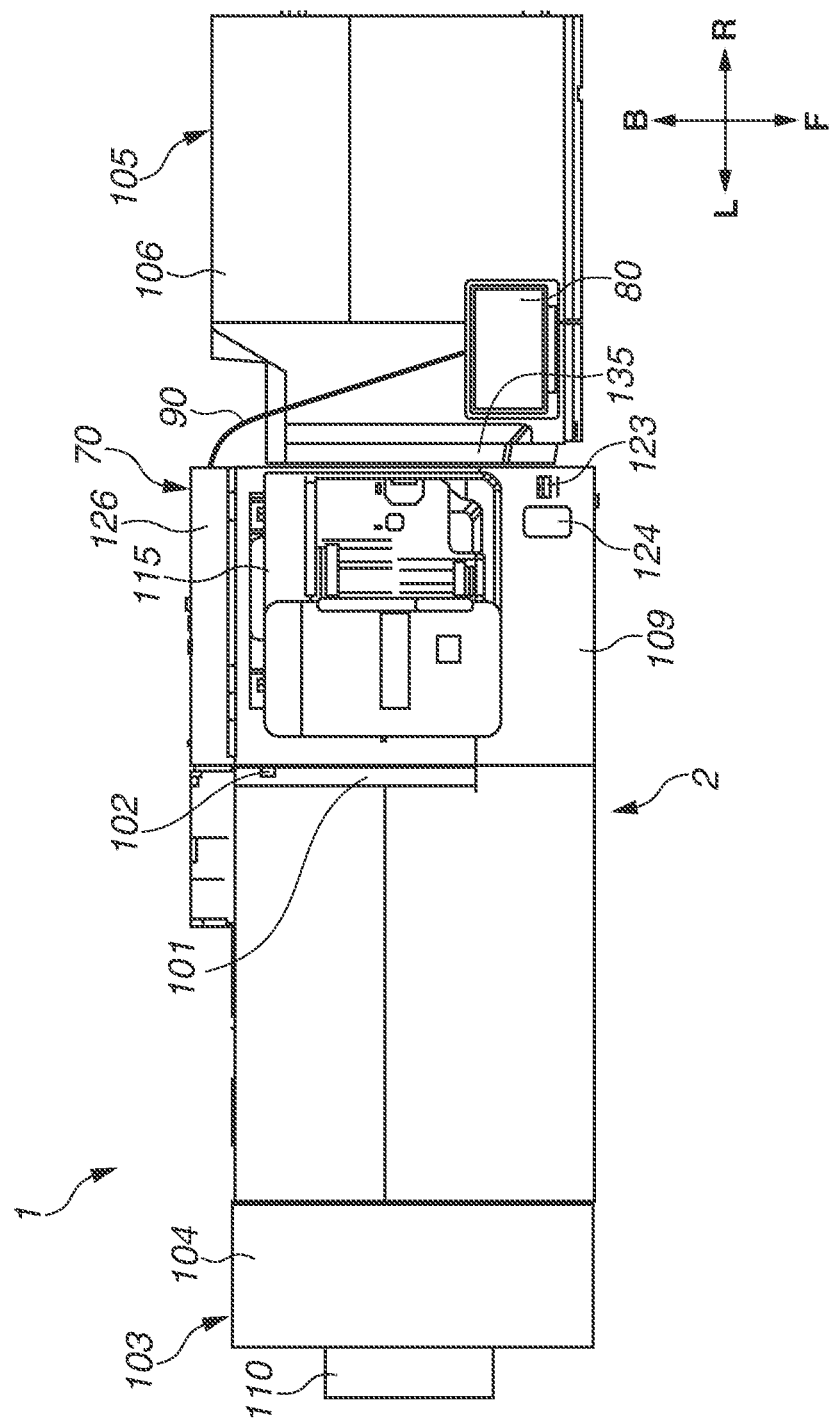
FIG. 5 is a diagram illustrating a state where the operation unit is placed on a top face on a right side of the reading apparatus, from among top faces of housings included in the image forming system.

FIGS. 4 and 5 are diagrams illustrating positions on the top face 109 where the operation unit 80 can be placed. For example, as illustrated in FIG. 4, the operation unit 80 can be placed on the top face 109 of the image forming apparatus 2 in a space close to a document reading apparatus 115. Alternatively, as illustrated in FIG. 5, the operation unit 80 can be placed in a space on a top face 106 of a sheet feeding apparatus 105. Instead of placing the operation unit 80 as illustrated in FIG. 4 or 5, the operation unit 80 can be placed on a top face of the image forming system 1 such as a top face 104 of the post-processing apparatus 103. Further, the operation unit 80 can be placed in a space other than on the top face of the image forming system 1, such as on a working table (not illustrated) installed in a vicinity of the image forming system 1.

Figure 6A:
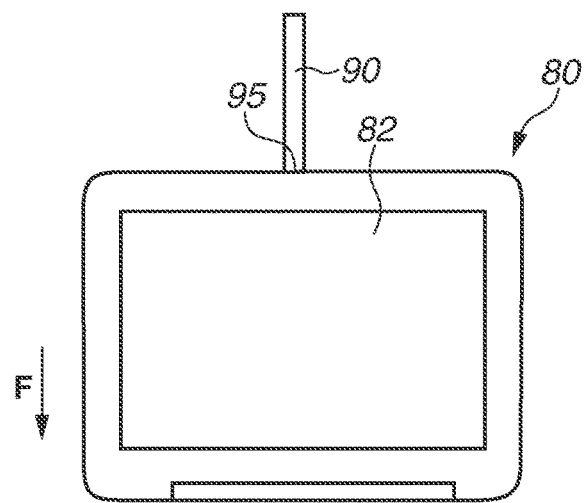
FIGS. 6A to 6C are diagrams illustrating the operation unit.
Figure 6B:
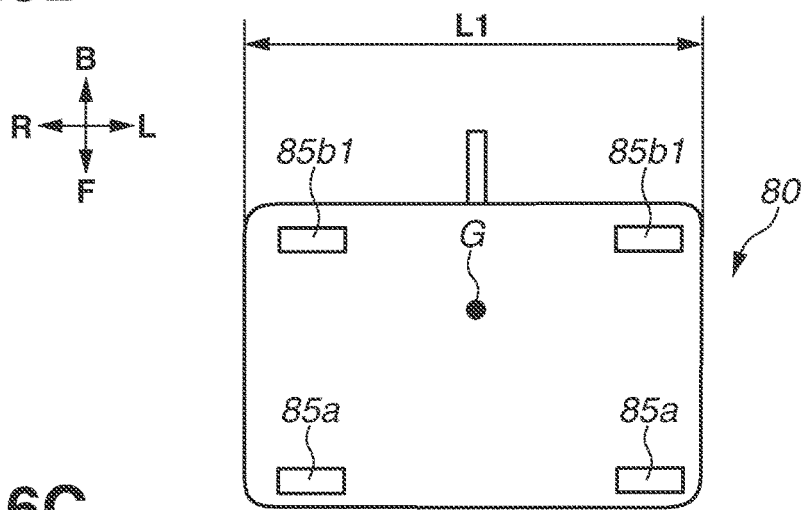
Figure 6C:
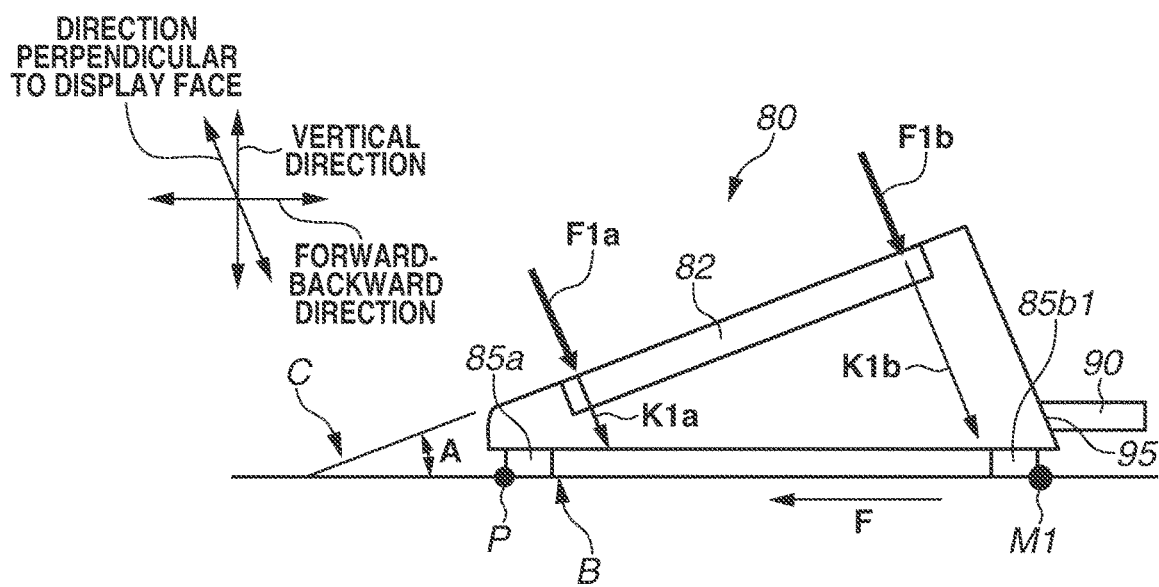

FIG. 6A is a diagram illustrating the operation unit 80 placed on a horizontal face, viewed from an upper side of the operation unit 80 in the vertical direction. FIG. 6B is a diagram illustrating the operation unit 80 placed on a horizontal face, viewed from a lower side of the operation unit 80 in the vertical direction. In other words, FIG. 6B is a diagram illustrating a bottom face of the operation unit 80. FIG. 6C is a diagram illustrating the operation unit 80 viewed from a right side thereof.

As illustrated in FIG. 6A, the operation unit 80 includes the display panel 82 capable of displaying information relating to image formation. The display panel 82 is a liquid crystal touch panel capable of accepting touch operation performed by the user.

The cable 90 is extended from a back side of the operation unit 80. As illustrated in FIG. 6B, rubber feet 85 (85$a$ and 85$b1$) as an example of an elastic member are arranged on the bottom face of the operation unit 80. The rubber feet 85 are an example of first to fourth contact portions. The rubber feet 85 are rubber members that are in contact with the top face 109 when the operation unit 80 is placed on the top face 109. Because a surface of each rubber foot 85 consists of a member having a frictional coefficient higher than a frictional coefficient of a resin cover that constitutes an exterior member of the operation unit 80, the rubber foot 85 is slightly warped (elastically deformed) when the operation unit 80 is placed on the top face 109. Thus, as described in the present exemplary embodiment, the operation unit 80 can be supported at four points.

Although a plane is generally determined by three points, all of the four rubber feet 85 are in contact with the top face 109 because any one of the rubber feet 85 is warped. In the present exemplary embodiment, the front side rubber feet 85$a$ are arranged at two places on the front side of the operation unit 80, and the depth side rubber feet 85$b1$ are arranged at two places on the depth side. With this configuration, the operation unit 80 will not be inclined even if the user presses anywhere on the display panel 82, so that it is possible to reduce a risk of making the operation unit 80 unstable.

As illustrated in FIG. 6B, the four rubber feet 85 are arranged to surround a gravity center G of the operation unit 80. In other words, in the vertical direction, the gravity center G is positioned within an area surrounded by the four rubber feet 85 when the operation unit 80 is viewed from the upper side of the operation unit 80 in the vertical direction. With this arrangement, the operation unit 80 is stably supported by the four rubber feet 85, so that user's operability is improved. In addition, the number of rubber feet is not limited to four, and a fifth rubber foot that does not substantially contribute to support of the operation unit 80 may also be arranged thereon. For example, a fifth rubber foot having a frictional coefficient higher than that of the four rubber feet 85 may be in contact with the top face 109. In this case, an amount of the fifth rubber foot projected from a supporting base 821 is set to be slightly smaller than an amount of each of the four rubber feet 85 projected from the supporting base 821, so that the fifth rubber foot is in contact with the top face 109 as the four rubber feet 85 deform elastically.

In an uphill direction of the inclination of the display panel 82, the rubber feet 85$a$ are positioned on the upstream side of the gravity center G, whereas the rubber feet 85$b1$ are positioned on the downstream side of the gravity center G. Herein, "the uphill direction of the inclination of the display panel 82" is a direction parallel to both of "a direction perpendicular to both of a direction perpendicular to a display face 820 and a vertical direction (a front surface-back surface direction of the sheet)" and "the direction perpendicular to the display face 820".

One of the two rubber feet 85$b1$ is arranged in a right end portion on the bottom face of the operation unit 80 and the other of the two rubber feet 85$b1$ is arranged in a left end portion thereon. Herein, because it is assumed that the operation unit 80 placed on the top face 109 is viewed from the bottom side of the operation unit 80, a left side of FIG. 6B is defined as the right side of the operation unit 80, and a right side of FIG. 6B is defined as the left side of the operation unit 80. When the width in a right-left direction of the operation unit 80 is expressed as L1, it is preferable that one of the rubber feet 85$b1$ be positioned in an area on the rightmost side (one end side) when the width L1 is divided into four areas whereas the other of the rubber feet 85$b1$ be positioned in an area on the leftmost side (another end side). As described above, by arranging the two rubber feet 85$b1$ with a space therebetween, stability of the operation unit 80 can be improved when the operation unit 80 is placed on the top face 109.

Herein, the right-left direction refers to a width direction of the operation unit 80, i.e., the direction perpendicular to both of the direction perpendicular to the display face 820 and the vertical direction.

FIG. 6C is a diagram illustrating a side view of the operation unit 80 placed on the top face 109. A face that is formed because the rubber feet 85 follows the top face 109 when the operation unit 80 is placed thereon is referred to as a rubber foot face and is expressed as a face B in FIG. 6C. Because the operation unit 80 is a rigid body, when rigid bodies are used for the four rubber feet 85, a plane is formed by three of the four rubber feet 85 in terms of component tolerance. In a case where the rubber feet 85 are arranged at four places, elastic bodies are to be used for at least two or more rubber feet 85, so that the rubber feet 85 function as supporting portions to follow the top face 109.

Herein, the display panel 82 has a pressing area in the forward-backward direction of the apparatus. The user performs operation in a direction perpendicular to the display panel 82. Thus, a pressing force applied on the front side of the apparatus is referred to as an apparatus front side pressing force F1$a$, and a pressing force applied on the depth side of the apparatus is referred to as an apparatus depth side pressing force F1$b$. Then, lines extended to the rubber feet 85 indicate the pressing directions of pressing forces F1$a$ and F1$b$ and are respectively referred to as an apparatus front side pressing direction line K1$a$ and an apparatus depth side pressing direction line K1$b$. When a front side end portion of the front side rubber foot 85$a$ is referred to as a front side rubber end portion P, and a depth side end portion of the depth side rubber foot 85$b$1 is referred to as a depth side rubber end portion M1, the front side rubber end portion P and the depth side rubber end portion M1 are arranged so that the apparatus front side pressing direction line K1$a$ and the apparatus depth side pressing direction line K1$b$ are extended to a range between the front side rubber end portion P and the depth side rubber end portion M1.

In order to satisfy the above-described condition, as described below, if the front side rubber end portion P of the operation unit 80 is specified as a reference, the depth side rubber end portion M1 has to be arranged at a position further on the depth side when an inclination angle A is increased. Then, a size of the operation unit 80 has to be larger on the depth side if the front side is specified as the reference.

With this configuration, even if the display panel 82 is pressed, the operation unit 80 is not rotated with the front side rubber end portion P or the depth side rubber end portion M1 as a pivot, so that a rubber foot on the opposite side, i.e., the depth side rubber foot 85$b$1 or the front side rubber foot 85$a$, is not lifted upward. Thus, operability thereof can be prevented from being degraded. If a weight of the operation unit 80 is increased for the purpose of preventing the rotation from occurring when the operation unit 80 is operated, the user cannot move the operation unit 80 easily, so that the operability will be lowered.

It is assumed that the angle A formed by the rubber foot face B and a panel face C is set to 30 degrees, i.e., a predetermined angle at which preferable operability can be obtained as described below. Herein, the panel face C is a virtual plane face parallel to the below-described display face 820 of the display panel 82. Further, the rubber foot face B is a face parallel to the top face 109. However, a concept of parallel herein does not mean parallel in a strictly mathematical sense, but means parallel in a practical sense, i.e., substantially parallel.

A benefit of extending the cable 90 from the back side of the operation unit 80 will be described with reference to FIG. 6C. As illustrated in FIG. 6C, the cable 90 is extended from the operation unit 80 in the uphill direction of the display panel 82 when the operation unit 80 is viewed in the vertical direction. In other words, the cable 90 is extended from the operation unit 80 in the uphill direction of the inclination of the display panel 82 that is perpendicular to both of the direction perpendicular to both of the direction perpendicular to the below-described display face 820 and the vertical direction (the front surface-back surface direction of the sheet) and the direction perpendicular to the display face 820. Specifically, when the user who is standing on the upstream side of the operation unit 80 views the operation unit 80 in the uphill direction of the inclination of the display panel 82, a lead out port 95 from which the cable 90 is led out is formed on a wall on the back side of the supporting base 821. The cable 90 is extended from the lead out port 95.

Because the cable 90 is extended backward from the depth side of the operation unit 80, a connected portion of the cable 90 and the operation unit 80 cannot be viewed from the user who operates the operation unit 80. In this way, design of the operation unit 80 can be improved.

<Inclination Angle of Display Face of Operation Unit with Respect to Top Face of Housing>

Figure 7A:
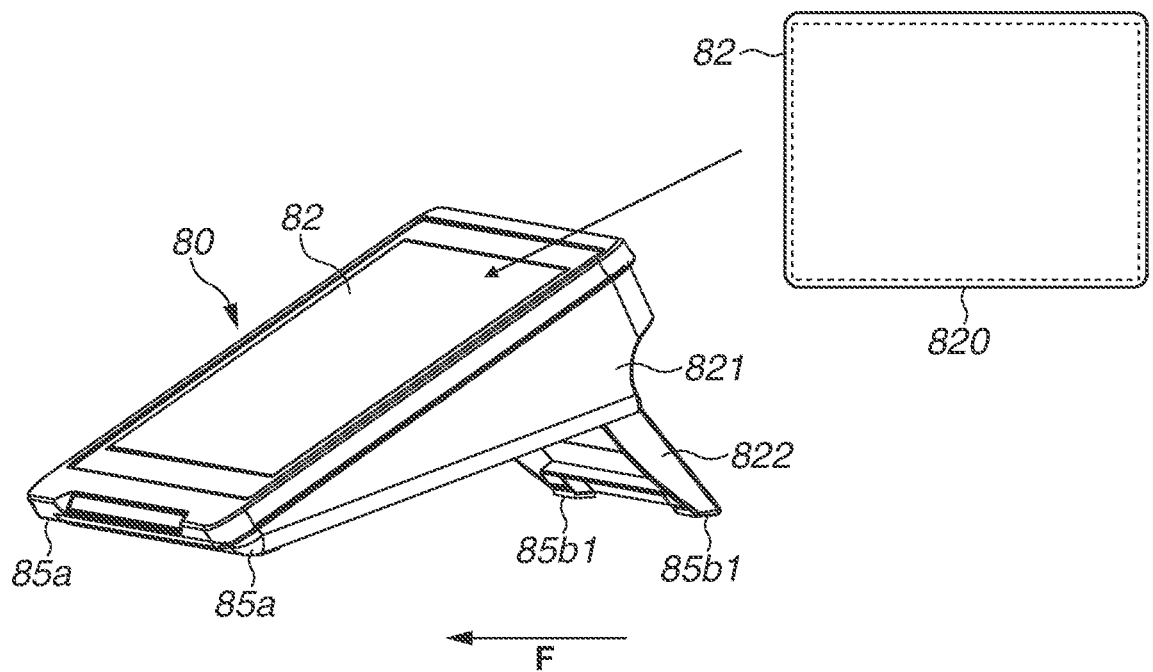
FIGS. 7A and 7B are diagrams schematically illustrating perspective views of the operation unit.
Figure 7B:
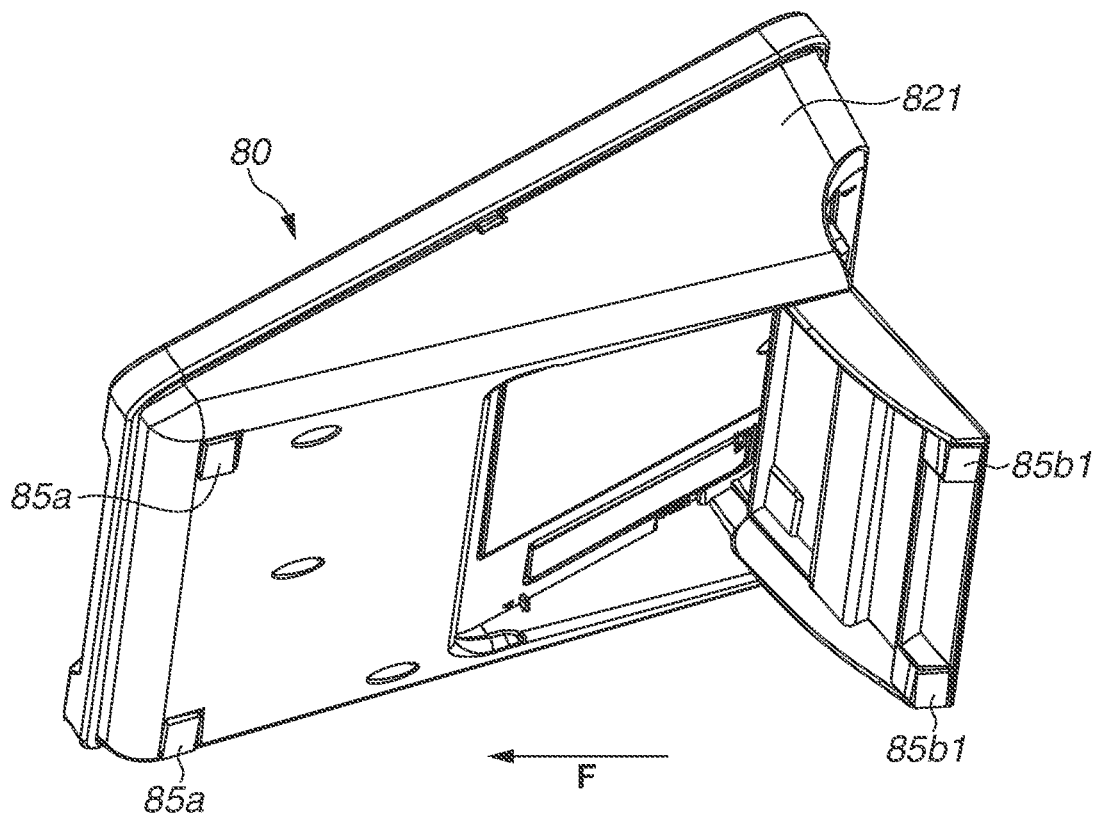

FIG. 7A illustrates a perspective view of the operation unit 80 and an enlarged schematic view of the display panel 82. As illustrated in FIG. 7A, the operation unit 80 includes the supporting base 821 having the rubber feet 85. Since the supporting base 821 is provided, the display panel 82 is inclined a predetermined angle with respect to the top face 109. Further, the supporting base 821 has an arm 822 on which the rubber feet 85$b$1 are arranged. The arm 822 is provided to the supporting base 821 in a rotatable state. By rotating the arm 822 with respect to the supporting base 821, an inclination angle of the display panel 82 with respect to the top face 109 can be adjusted.

The display panel 82 includes the display face 820. Screens displaying information about image formation and a setting of printing condition, such as a screen displaying a copy start button, a screen for setting a sheet size, a screen for setting the number of printing copies, and a screen displaying a remaining amount of toner can be displayed on the display face 820. For example, the user can set the number of printing copies by touching and selecting a numerical key displayed on the display face 820. In the present exemplary embodiment, the display face 820 is provided in the display panel 82 except for an edge portion thereof. However, the screens for displaying information about image formation and print setting may be displayed on the entire face of the display panel 82. However, in any of these cases, an angle formed by a portion near the center of the display panel 82 (i.e., an area corresponding to the display face 820 in FIG. 7A) and the top face 109 is defined as the inclination angle of the display face 820 with respect to the top face 109. Visibility preferable for the user can be ensured by adjusting the inclination angle of the display face 820 with respect to the top face 109 to 5 degrees or more and 45 degrees or less. In order to easily measure the inclination angle, a 30-millimeter square area including the center of the display face 820 is specified, and an angle formed by a line extended from this area and the top face 109 is measured. Measuring an angle formed by a ruler placed on this area and the top face 109 is one example of the simple measuring method.

A conventionally-known operation unit will be briefly described. The conventionally-known operation unit is an elevation face operation unit having a display forming an angle of 90 degrees with respect to a top face. Generally, the display of the elevation face operation unit is rotatably attached to an arm. In other words, the user can change the angle of the display with respect to the top face depending on the user's preference.

However, the display of the elevation face operation unit is not suitable for touch operation. Because the display is rotatably attached to the arm, the display may be rotated about the arm when the user presses the display to perform the touch operation. Originally, when the user performs the touch operation on the display of the elevation face operation unit, the operation unit becomes unstable unless the user adjusts the touching force. Thus, the operation cannot be performed easily.

Next, the inclination angle A of 5 degrees, regarded as a lower limit of the inclination angle A, will be described. When the operation unit 80 is freely placeable, the operation unit 80 can be rotated 90 degrees or 180 degrees without meaningful restriction. Thus, the operation unit 80 can be placed in an orientation other than an orientation in which a front face of the operation unit 80 conforms to an apparatus front face F. In this case, if the lower limit of the inclination angle A is close to that of a horizontal surface, for example, 0 degree, the user standing on a side of the apparatus front face F may not be able to distinguish the front side of the operation unit 80. Thus, there is a possibility that the operation unit 80 is operated in an orientation in which the operation unit 80 is rotated 90 degrees or 180 degrees. Further, when the user moves the operation unit 80 to make the front side of the operation unit 80 conform to the front side of the image forming system 1, it may be difficult to distinguish which side is the front side of the operation unit 80.

Figure 8A:
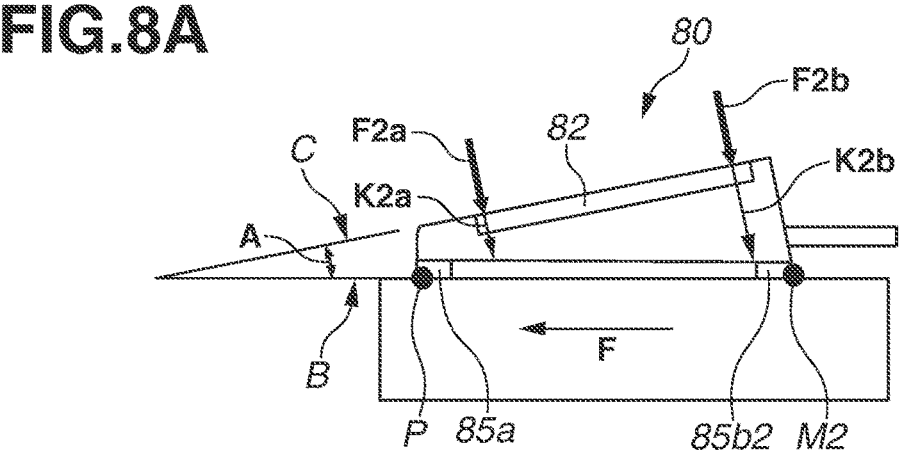
FIGS. 8A to 8C are diagrams illustrating the operation unit with an inclination angle of a display face changed with respect to the top face.

Thus, the display face 820 is arranged to be slightly inclined at the inclination angle A. With this configuration, the user can distinguish which side is the front side of the operation unit 80 even if the user is slightly away from the operation unit 80. FIG. 8A is a diagram illustrating a side view of the operation unit 80 having the inclination angle A of 5 degrees. If the inclination angle A is less than 5 degrees, it will be difficult to distinguish which side is the original front side when the operation unit 80 is moved. Thus, there is a risk that the user is unable to easily determine from which direction to operate. Therefore, it is preferable that the inclination angle A be 5 degrees or more.

Similar to the above-described example in which the inclination angle is 30 degrees, when the inclination angle is 5 degrees, pressing forces are referred to as a front side pressing force F2$a$ and a depth side pressing force F2$b$. Then, lines indicating pressing directions, extended to the rubber feet 85, are respectively defined as a front side pressing direction line K2$a$ and a depth side pressing direction line K2$b$. The front side rubber end portion P and a depth side rubber end portion M2 are arranged so that an intersection point of the front side pressing direction line K2$a$ and the top face 109 and an intersection point of the depth side pressing direction line K2$b$ and the top face 109 are positioned within a range between the front side rubber end portion P and the depth side rubber end portion M2.

With this configuration, even if the display panel 82 is pressed, the operation unit 80 is not rotated with the front side rubber end portion P or the depth side rubber end portion M2 as a pivot, so that a rubber foot on the opposite side, i.e., a depth side rubber foot 85$b$2 or the front side rubber foot 85$a$, is not lifted upward. Thus, operability thereof can be prevented from being degraded.

In general, a height from a floor surface on which the image forming system 1 is installed to the top face 109 is 900 to 1100 mm. When the height of the top face 109 is measured, a distance from the floor surface to a portion having the largest flat area in the top face 109 of the image forming system 1 is measured. A measurement value is defined as the height of the top face 109. In other words, a height of the work space 1010 from the floor surface can also be defined by the measurement value. Accordingly, a top face of the document reading apparatus 115, for example, is not regarded as the work space 1010. However, if there is a portion described as a placement portion of the operation unit 80 in a product catalog, the portion can be defined as one of the work spaces 1010.

Herein, according to statistics, 90% or more of males have heights of 1600 mm to 1790 mm, and 90% or more of females have heights of 1500 mm to 1690 mm. Accordingly, for example, if the display face 820 is viewed from a viewpoint at a height of 1500 mm from the floor surface when the height of the top face 109 is 1100 mm, a difference between the heights is 400 mm. Because such a user views the operation unit 80 from a comparatively low viewpoint, visibility of the display face 820 will be lowered if the inclination angle with respect to the top face 109 is less than 5 degrees. By setting the inclination angle to 5 degrees or more, the user can view the display face 820 in a comparatively less stressful posture.

As described above, it is preferable that the inclination angle of the display face 820 with respect to the top face 109 be 5 degrees or more.

Next, the inclination angle A of 45 degrees, regarded as an upper limit of the inclination angle A, will be described with reference to FIG. 8B. Similar to the above-described example in which the inclination angle is 30 degrees, when the inclination angle is 45 degrees, pressing forces are referred to as a front side pressing force F3$a$ and a depth side pressing force F3$b$. Then, lines indicating pressing directions, extended to the rubber feet 85, are respectively defined as a front side pressing direction line K3$a$ and a depth side pressing direction line K3$b$. The front side rubber end portion P and a depth side rubber end portion M3 are arranged so that an intersection point of the front side pressing direction line K3$a$ and the top face 109 and an intersection point of the depth side pressing direction line K3$b$ and the top face 109 are positioned within a range between the front side rubber end portion P and the depth side rubber end portion M3.

With this configuration, even if the display panel 82 is pressed, the operation unit 80 is not rotated with the front side rubber end portion P or the depth side rubber end portion M3 as a pivot, so that a rubber foot on the opposite side, i.e., a depth side rubber foot 85$b$3 or the front side rubber foot 85$a$, is not lifted upward. Thus, operability thereof can be prevented from being degraded.

Figure 8B:
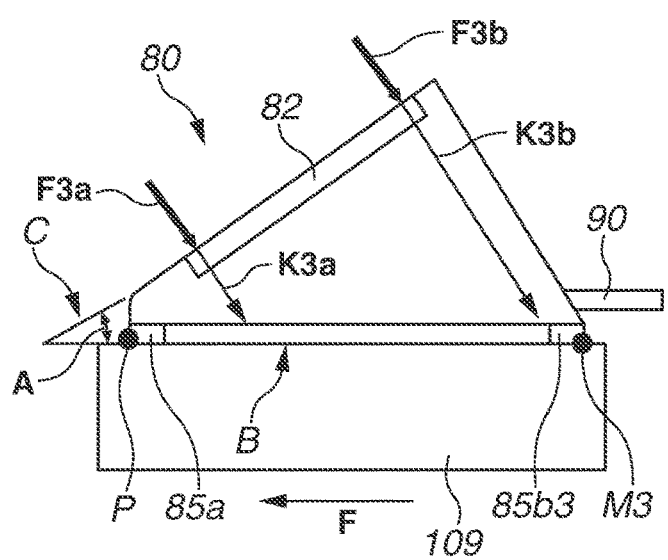
Figure 8C:
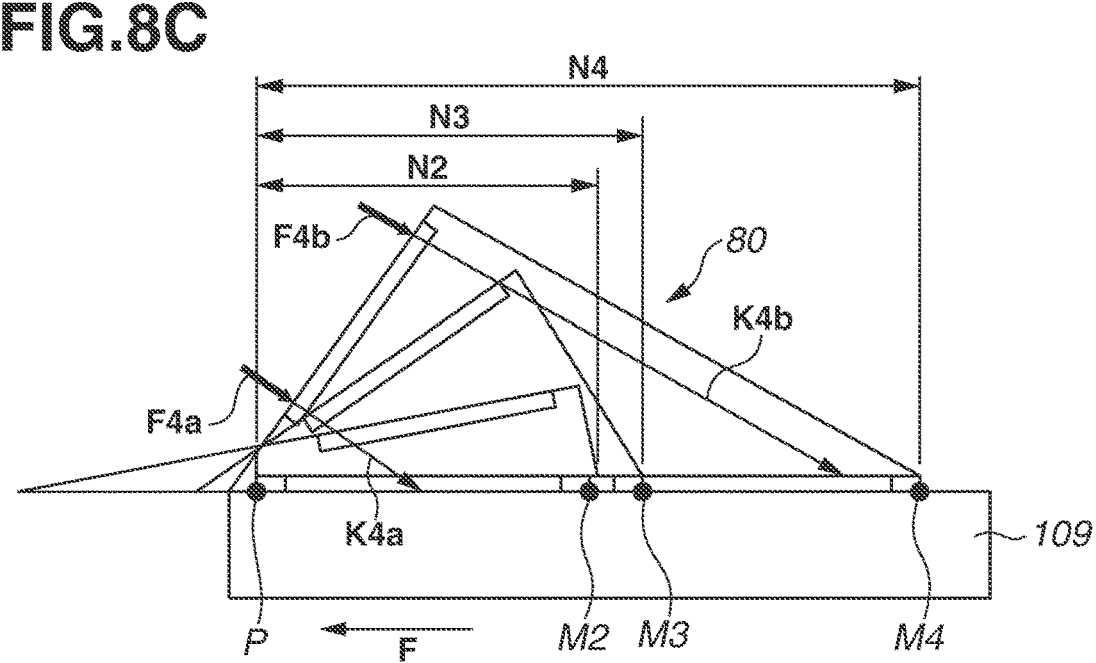

In FIG. 8C, in addition to the examples of the inclination angles of 5 degrees and 45 degrees in FIGS. 8A and 8B, respectively, as one example of the inclination angle greater than 45 degrees, the inclination angle of 60 degrees is illustrated, in a state where each front side rubber end portion P of the operation unit 80 is aligned with the others.

Similar to the above-described example in which the inclination angle is 30 degrees, when the inclination angle is 60 degrees, pressing forces are referred to as a front side pressing force F4$a$ and a depth side pressing force F4$b$. Then, lines indicating pressing directions, extended to the rubber feet 85, are respectively defined as a front side pressing direction line K4$a$ and a depth side pressing direction line K4$b$. The front side rubber end portion P and a depth side rubber end portion M4 are arranged so that an intersection point of the front side pressing direction line K4$a$ and the top face 109 and an intersection point of the depth side pressing direction line K4$b$ and the top face 109 are positioned within a range between the front side rubber end portion P and the depth side rubber end portion M4.

Herein, a depth of the operation unit 80 inclined at 5 degrees (referred to as a 5-degree operation unit depth) is expressed as N2, a depth of the operation unit 80 inclined at 45 degrees (referred to as a 45-degree operation unit depth) is expressed as N3, and a depth of the operation unit 80 inclined at 60 degrees (referred to as a 60-degree operation unit depth) is expressed as N4.

As illustrated in FIG. 8C, when the front side rubber end portion P is used as a reference, the depth side rubber end portion M2 is moved to the positions of the depth side rubber end portions M3 and M4 in conjunction with the increase in the inclination angle, so that the operation unit depth N2 is also increased to N3 and N4. Particularly, when the inclination angle is 45 degrees or more, a rate of expansion of the operation unit 80 in the depth direction N is increased. Thus, the operation unit 80 is increased in size, and an installation place thereof is limited. Therefore, it is preferable that the upper limit of the inclination angle A be 45 degrees.

Further, when a height of the user's viewpoint is 1790 mm and a height of the top face 109 from the floor surface is 900 mm, a difference between the heights is 890 mm. In this case, if the inclination angle of the display face 820 with respect to the top face 109 is too steep, it is difficult for the user is to view the display face 820 unless the user leans forward. By adjusting the inclination angle of the display face 820 with respect to the top face 109 to 45 degrees or less, even the user who views the display face 820 from a comparatively high viewpoint can visually recognize the display face 820 easily.

Therefore, favorable visibility and operability can be ensured by setting the inclination angle A of the display face 820 with respect to the top face 109 to 5 degrees or more and 45 degrees or less.

<Appropriate Inclination Angle A>

With consideration for a height of the position where the operation unit 80 is placed and a visibility height depending on the height of the operator, an angle appropriate for ensuring the visibility of the display panel 82 is set within a range of the above-described upper limit and the lower limit. In the present exemplary embodiment of the present disclosure, the inclination angle A is set to an angle at which both of a tall user and a short user can visually recognize the display panel 82 when the operation unit 80 is placed on the top face 109.

Figure 9:
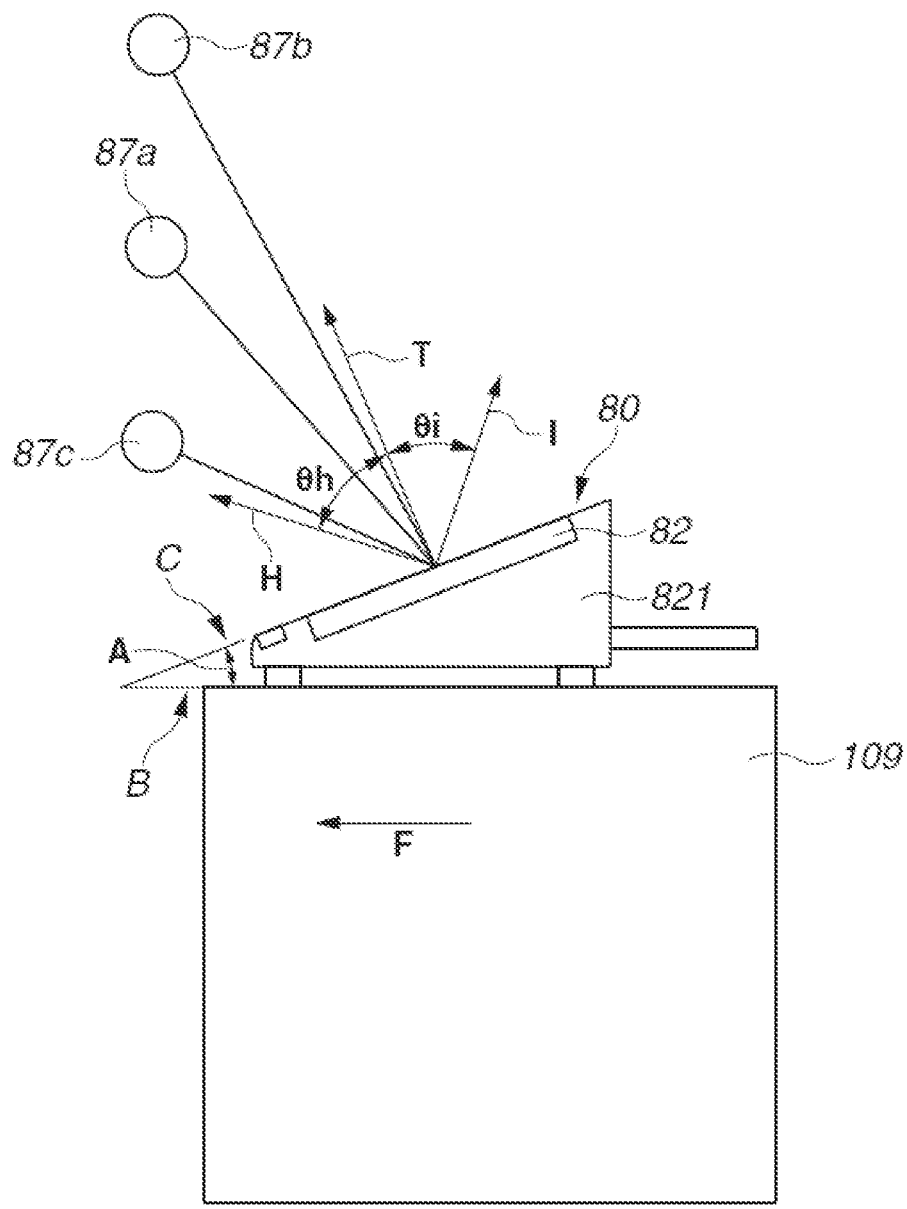
FIG. 9 is a diagram illustrating visibility when the display face of the operation unit is viewed from viewpoints of different heights.

The present exemplary embodiment will be described with reference to FIG. 9. FIG. 9 is a diagram illustrating a side view of the operation unit 80 placed on the work space 1010 of the top face 109. In the present exemplary embodiment, it is assumed that a height of the top face 109 from the floor surface is 1040 mm, and the inclination angle A is set to 30 degrees at which the display panel 82 is visually recognizable when the operation unit 80 is placed thereon.

A liquid crystal unit of the display panel 82 has a range (viewing angle) in which a certain level of contrast is be ensured. In FIG. 9, a line perpendicular to the liquid crystal unit is indicated by T, a viewing range on a depth side is indicated by I, and a viewing range on a front side is indicated by H. Then, an angle formed by the line T and the range I is referred to as a depth side viewing angle θi, and an angle formed by the line T and the range H is referred to as a front side viewing angle θh. In the present exemplary embodiment, a liquid crystal component having the viewing angles θi and θh each set to 50 degrees is used.

Further, when positions 87a, 87b, and 87c respectively represent a position of the eyes of a user of an average height, a position of the eyes of a tall user, and a position of the eyes of a short user, lines indicating visibility from the positions 87a, 87b, and 87c are substantially included within the viewing range of H to I if the angle of the operation unit 80 placed on the top face 109 having a height of 1040 mm from the floor surface is set to 30 degrees. Thus, the favorable visibility and operability can be ensured.

With this configuration, the display panel 82 is favorably visible from the eye level of the tall user as well as the eye level of the short user.

In the present exemplary embodiment, an appropriate angle of the operation unit 80 is specified as 30 degrees based on the condition that the height of the top face 109 where the operation unit 80 is placed is 1040 mm. However, there is a case where a height of a place where the operation unit 80 is moved is higher or lower than 1040 mm. There is an angle appropriate for each height. Normally, as long as the height is a height of a multifunction peripheral installed on a floor, which falls within a range of approximately 900 mm to 1100 mm, the user can view the display panel 82 at the inclination angle of 5 to 45 degrees by moving the operation unit 80 forward or backward to change the placement position.

<Adjustment Mechanism of Operation Unit Angle A>

The users of various heights from tall to short touch and operate the operation unit 80. In the present exemplary embodiment, the appropriate operation unit angle A calculated from the heights has been described as 30 degrees based on the condition that the operation unit 80 is placed on the top face 109 of the image forming apparatus 2 having the height of 1040 mm from the floor surface. However, there is a case where the operation unit 80 is operated by a user who is significantly tall or short. Further, there is also a case where the user prefers to set the operation unit angle A to be smaller than or greater than 30 degrees.

In consideration of the above-described users, the present exemplary embodiment will be described with respect to the operation unit 80 capable of adjusting the operation unit angle A not only to 30 degrees but also to an angle much smaller than 30 degrees, e.g., 15 degrees.

Figure 10A:
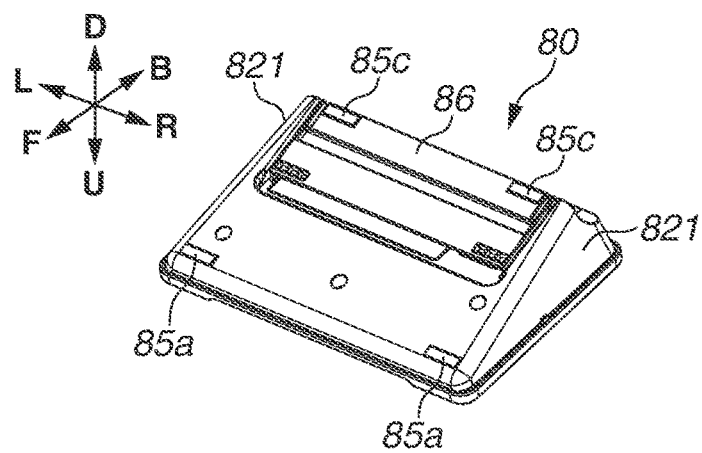
FIGS. 10A to 10D are diagrams illustrating an arm arranged on a supporting base for supporting the operation unit.
Figure 10B:
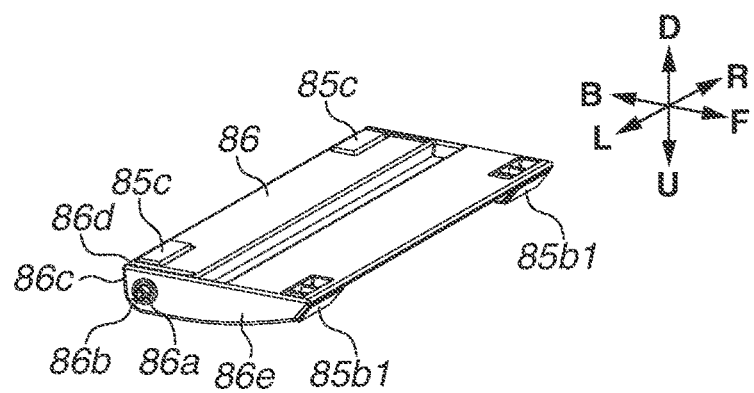
Figure 10C:
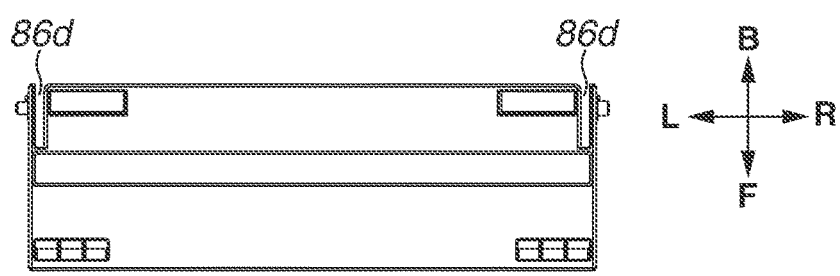
Figure 10D:
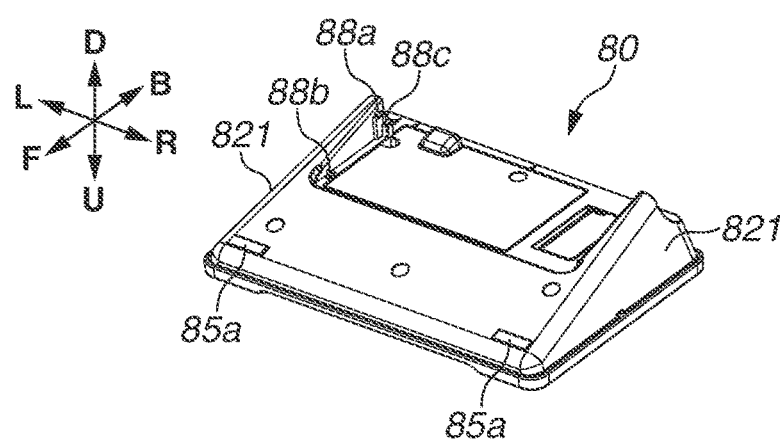

Hereinafter, an adjustment mechanism of the operation unit angle A (also referred to as an angle adjustment mechanism) will be described. First, a configuration of the angle adjustment mechanism will be described. FIG. 10A is a perspective view of a lower face side of the operation unit 80, FIG. 10B is a perspective view of an arm 86, FIG. 10C is a back view of the arm 86, and FIG. 10D is a perspective view of a lower face side of the operation unit 80 from which the arm 86 is removed. As illustrated in FIGS. 10B and 10C, the rubber feet 85b1, rubber feet 85c, a shaft 86a, a projection portion 86b, an abutting face 86c, and a slit 86d are arranged on the arm 86. Since the slit 86d is arranged thereon, the shaft 86a and an attaching face 86e having the projection portion 86b can warp in the rightward direction R. The shaft 86a, the projection portion 86b, the abutting face 86c and the slit 86d having the similar shapes (not illustrated) are also arranged on the opposite side in the rightward direction R. Further, as illustrated in FIG. 10D, a shaft bearing 88a and projection portions 88b and 88c are arranged on the operation unit 80 from which the arm 86 is removed. The shaft bearing 88a and the projection portions 88b and 88c having the similar shapes (not illustrated) are also arranged on the opposite side in the rightward direction R.

By inserting the shaft 86a of the arm 86 in FIG. 10B into the shaft bearing 88a in FIG. 10D, the arm 86 is attached to the operation unit 80 as illustrated in FIG. 10A. When the shaft 86a is inserted into the shaft bearing 88a, the attaching face 86e having the shaft 86a is warped by utilizing the slit 86d of the arm 86 in FIG. 10B, so that the shaft 86a is inserted thereto.

Figure 11A:
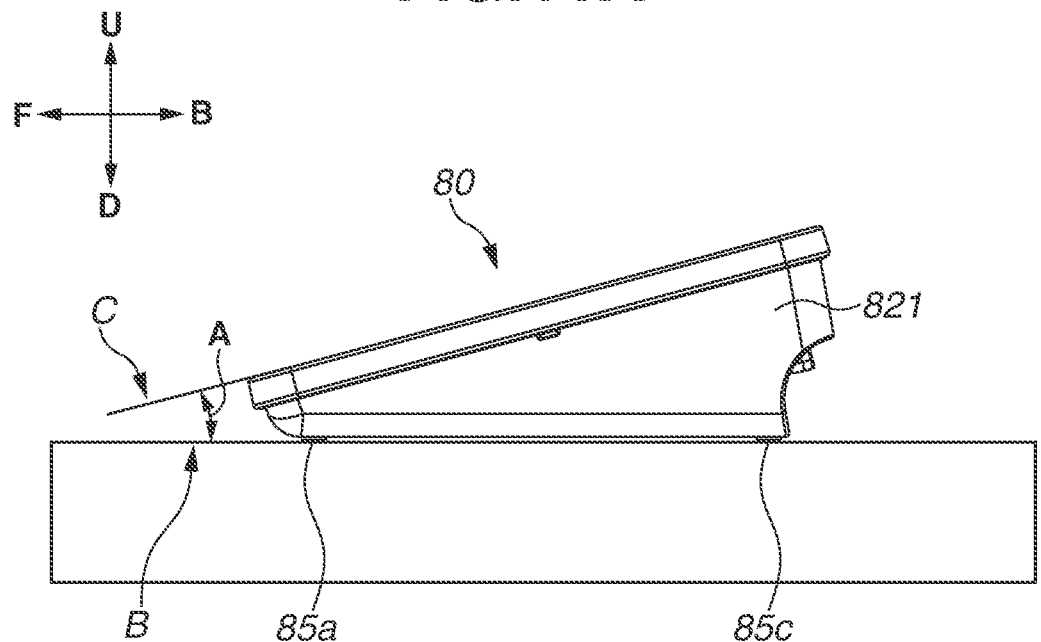
FIGS. 11A and 11B are diagrams illustrating adjustment of the inclination angle of the display face with respect to the top face executed by rotating the arm.
Figure 11B:
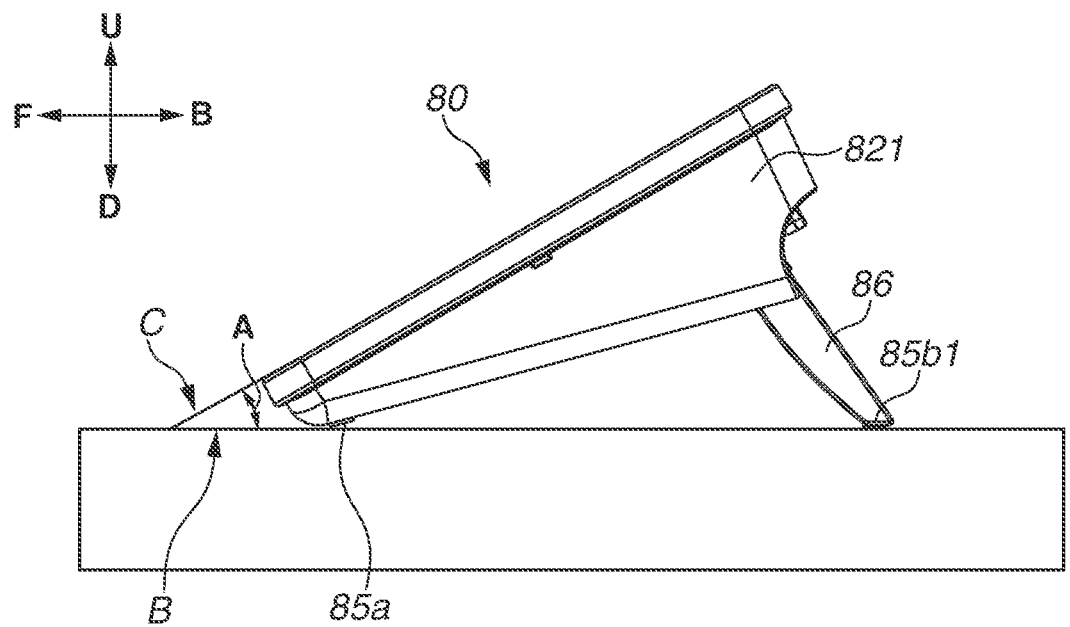
Figure 12A:
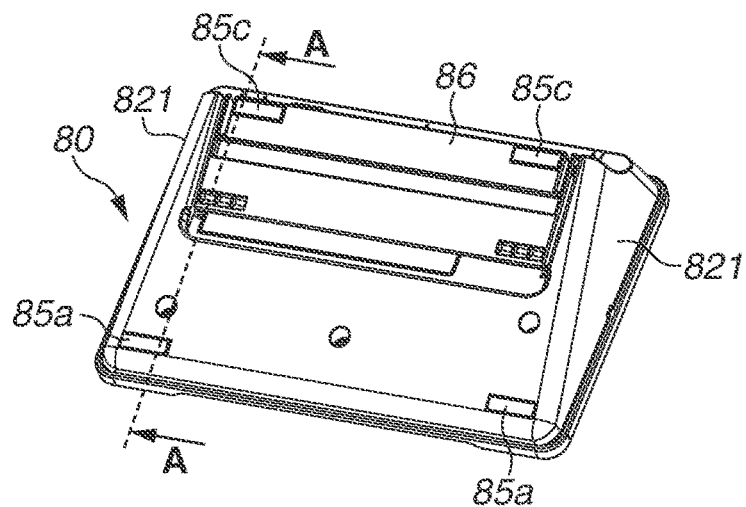
FIGS. 12A to 12C are perspective views of the operation unit illustrating rotation of the arm.
Figure 12B:
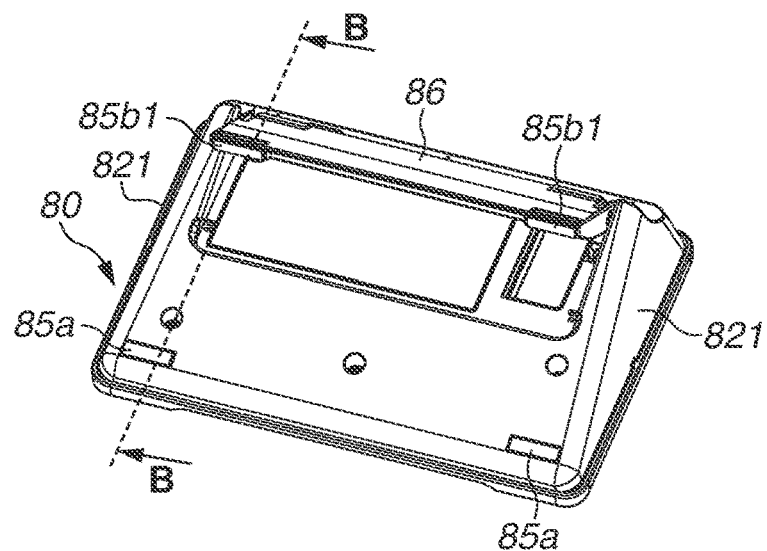
Figure 12C:
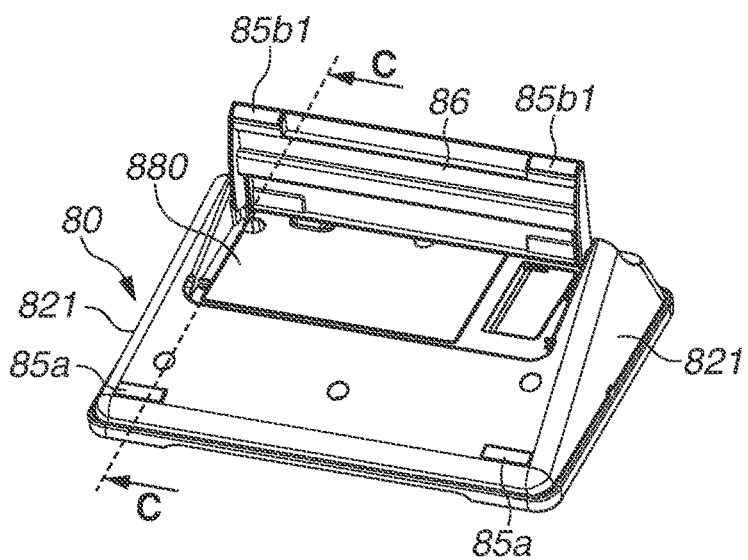
Figure 13A:
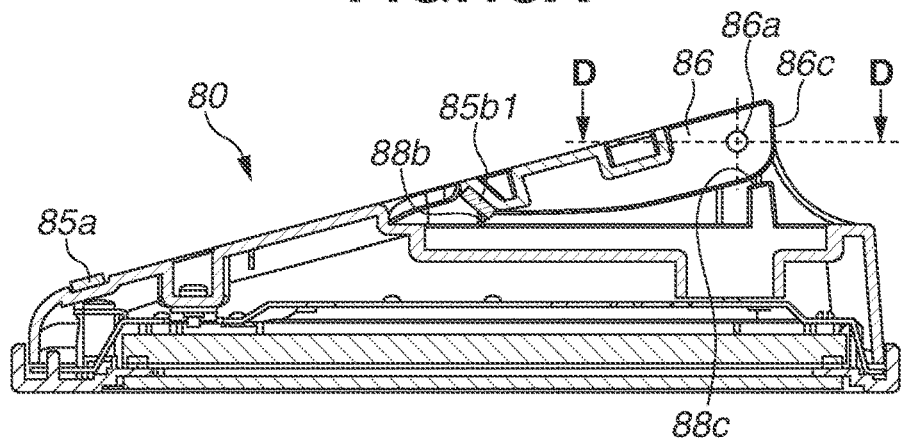
FIGS. 13A to 13C are cross-sectional diagrams of the operation unit illustrating rotation of the arm.
Figure 13B:
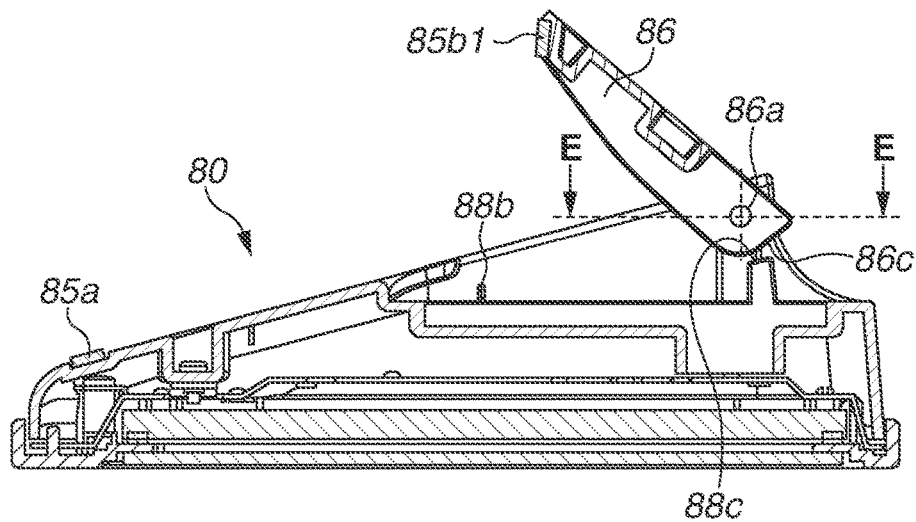
Figure 13C:
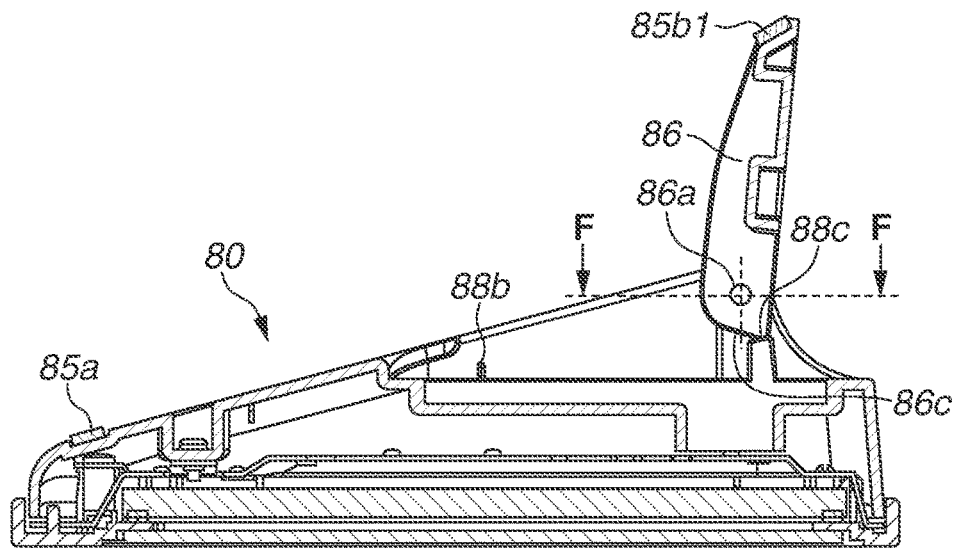

Next, opening and closing of the arm 86 will be described. FIG. 11A is a side view of the operation unit 80 (at the operation unit angle A of 15 degrees) when the arm 86 is closed, and FIG. 11B is a side view of the operation unit 80 (at the operation unit angle A of 30 degrees) when the arm 86 is opened. FIG. 12A is a perspective view of the lower face side of the operation unit 80 when the arm 86 is closed, FIG. 12B is a perspective view of the lower face side of the operation unit 80 when the arm 86 is brought into a state intermediate between the opened state and the closed state, and FIG. 12C is a perspective view of the lower face side of the operation unit 80 when the arm 86 is opened. FIG. 13A is a cross-sectional diagram taken along a line A-A in FIG. 12A, FIG. 13B is a cross-sectional diagram taken along a line B-B in FIG. 12B, and FIG. 13C is a cross-sectional diagram taken along a line C-C in FIG. 12C. As illustrated in FIGS. 10A to 10D, since the arm 86 is attached to the operation unit 80 via the shaft 86a (one example of a rotation shaft), the arm 86 can be opened and closed with the shaft 86a as a rotation center. When the arm 86 is closed, the rubber foot 85b1 comes in contact with the projection portion 88b as illustrated in FIG. 13A, and when the arm 86 is opened, the abutting face 86c abuts on the projection portion 88c as illustrated in FIG. 13C. With this configuration, the opening-closing angle of the arm 86 is regulated. Thus, as illustrated in FIGS. 11A and 11B, the operation unit angle A can be adjusted to two stages, i.e., the angle of 15 degrees when the arm 86 is closed (a first state of the arm 86), and the angle of 30 degrees when the arm 86 is opened (a second state of the arm 86). A distance between the rotation shaft and the top face 109 in the second state is greater than a distance between the rotation shaft and the top face 109 in the first state.

As illustrated in FIG. 12C, a storage space 880 for storing the arm 86 is provided on the bottom side of the operation unit 80. The arm 86 is stored in the storage space 880.

As illustrated in FIG. 13A, when the arm 86 is closed, the rubber foot 85b1 comes in contact with the projection portion 88b not only to regulate the opening-closing angle but also to reduce a contact noise. In the present exemplary embodiment, when the arm 86 is opened, the abutting face 86c abuts on the projection portion 88c to regulate the opening-closing angle. However, the opening-closing angle may be regulated by arranging the rubber foot 85c at a position at which the rubber foot 85c can come into contact with the projection portion 88b.

Figure 14A:
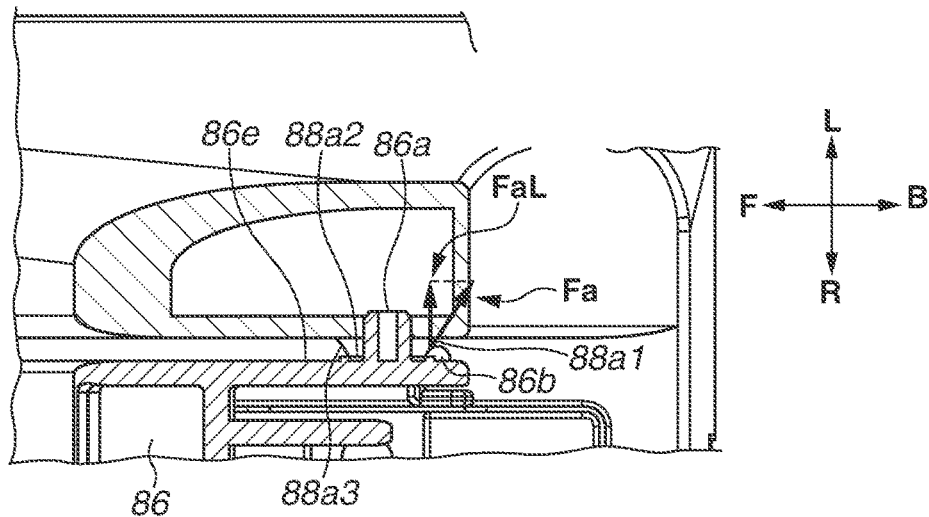
FIGS. 14A to 14C are cross-sectional diagrams of the operation unit illustrating peripheries of the arm.
Figure 14B:
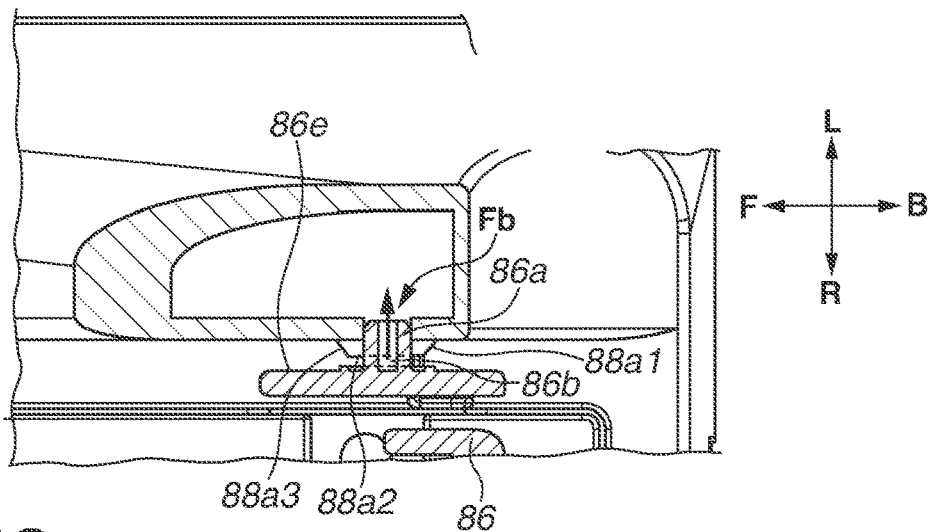
Figure 14C:
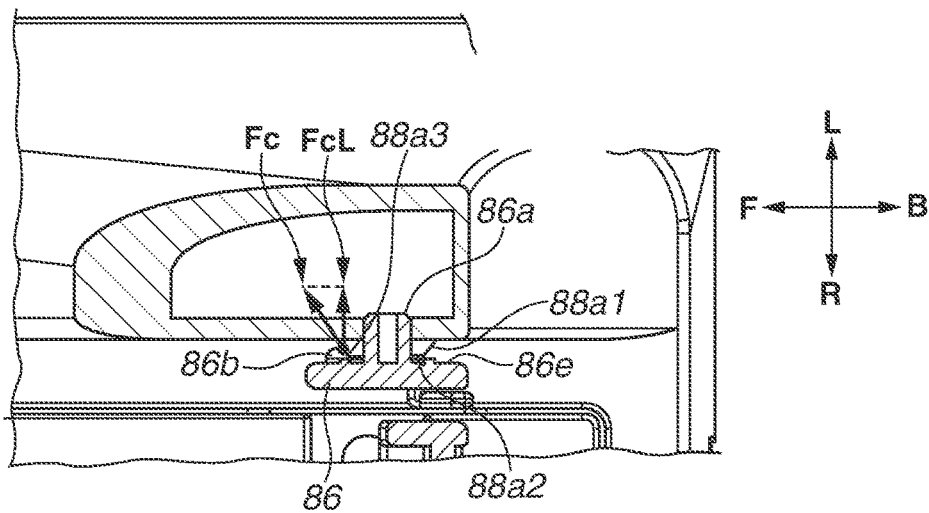

Next, a retracting force acting when the first state and the second state of the arm 86 is switched will be described. FIGS. 14A to 14C are cross-sectional diagrams each illustrating a vicinity of the shaft 86a of the arm 86 viewed from the lower face side of the operation unit 80. FIG. 14A is a cross-sectional diagram taken along a D-D line in FIG. 13A illustrating a state where the arm 86 is closed. FIG. 14B is a cross-sectional diagram taken along an E-E line in FIG. 13B illustrating a state where the arm 86 is brought into a state intermediate between the closed state and the opened state. FIG. 14C is a cross-sectional diagram taken along an F-F line in FIG. 13C illustrating a state where the arm 86 is opened. Arrows illustrated in the upper right portion of each of FIGS. 14A to 14C indicate the orientation of the operation unit 80 placed on the top face 109 of the image forming apparatus 2. A front side viewed from a front side of the image forming apparatus 2 is referred to as a forward direction F, a depth side (back side) thereof is referred to as a backward direction B, a left side thereof is referred to as a leftward direction L, and a right side thereof is referred to as a rightward direction R. As illustrated in FIGS. 14A to 14C, a positional relationship is such that the projection portion 86b of the arm 86 comes in contact with any one of an inclined surface 88a1, a horizontal surface 88a2, and an inclined surface 88a3 of the shaft bearing 88a depending on the opening-closing state of the arm 86.

As illustrated in FIG. 14A, when the arm 86 is closed, the attaching face 86e is warped in the rightward direction R. Thus, a force for restoring the attaching face 86e to a non-warped state, i.e., a restoring force in the leftward direction L, acts thereon, so that an inclined surface pressing force FaL that causes the projection portion 86b to press the inclined surface 88a1 is generated. The inclined surface pressing force FaL acts on the inclined surface 88a1. Thus, due to a pressing force Fa regarded as the inclined surface pressing force FaL in a direction of the inclined surface 88a1, the projection portion 86b continuously slides on the inclined surface 88a1 until the opening-closing angle is regulated.

Similarly, as illustrated in FIG. 14C, when the arm 86 is opened, the attaching face 86e is warped in the rightward direction R. Thus, a force for restoring the attaching face 86e to the non-warped state, i.e., a restoring force in the leftward direction L, acts thereon, so that an inclined surface pressing force FcL that causes the projection portion 86b to press the inclined surface 88a3 is generated. The inclined surface pressing force FcL acts on the inclined surface 88a3. Thus, due to a pressing force Fc regarded as the inclined surface pressing force FcL in a direction of the inclined surface 88a3, the projection portion 86b continuously slides on the inclined surface 88a3 until the opening-closing angle is regulated.

With this configuration, the force for causing the projection portion 86b to slide on the inclined surface is converted into a force for opening and closing the arm 86 via the shaft 86a, so that the retracting force is generated when the first state and the second state of the arm 86 are switched.

As illustrated in FIG. 14B, when the arm 86 is brought into the state intermediate between the closed state and the opened state, the attaching face 86e is also warped in the rightward direction R. Thus, a force for restoring the attaching face 86e to the non-warped state, i.e., a restoring force in the leftward direction L, acts thereon, so that a horizontal surface pressing force Fb that causes the projection portion 86b to press the horizontal surface 88a2 is generated. Because the horizontal surface pressing force Fb acts on the horizontal surface 88a2, a sliding force in the forward direction F or the backward direction B is not generated on the projection portion 86b. Therefore, the retracting force acting when the first state and the second state of the arm 86 are switched is not generated.

In the present exemplary embodiment, a configuration in which the rubber feet 85 (example of contact portions) are arranged at four places of the operation unit 80 placed on the top face 109 of the image forming apparatus 2 has been described as an example. However, the rubber feet 85 may be arranged at two places by connecting the rubber feet 85 to each other. Further, although the integrated-type arm 86 has been described as an example, the arm 86 may be separated into two or more portions.

Next, a modification of the above-described angle adjustment mechanism will be described. In the above-escribed angle adjustment mechanism, the inclination angle A of the operation unit 80 can only be set to two stages. Thus, the operation unit 80 having a screw leg 185a serving as a stepless angle adjustment mechanism will be described with reference to FIGS. 15A and 15B.

Figure 15A:
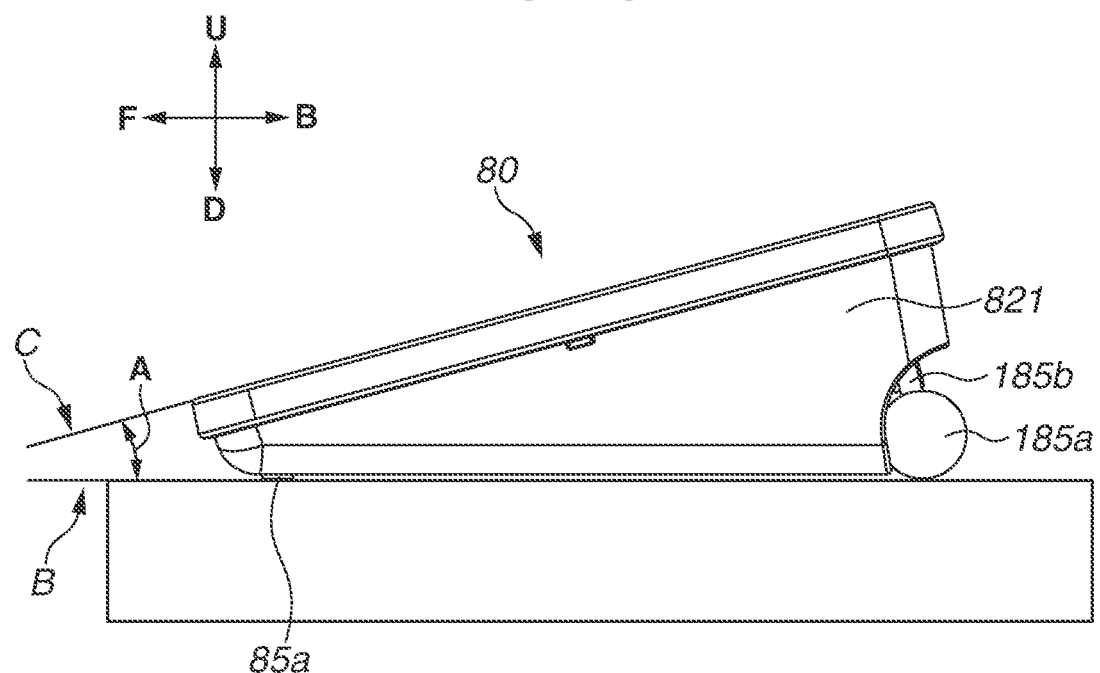
FIGS. 15A and 15B are diagrams illustrating a mechanism for adjusting an inclination angle of the display face with respect to the top face by using a leg portion on which a thread groove is formed.
Figure 15B:
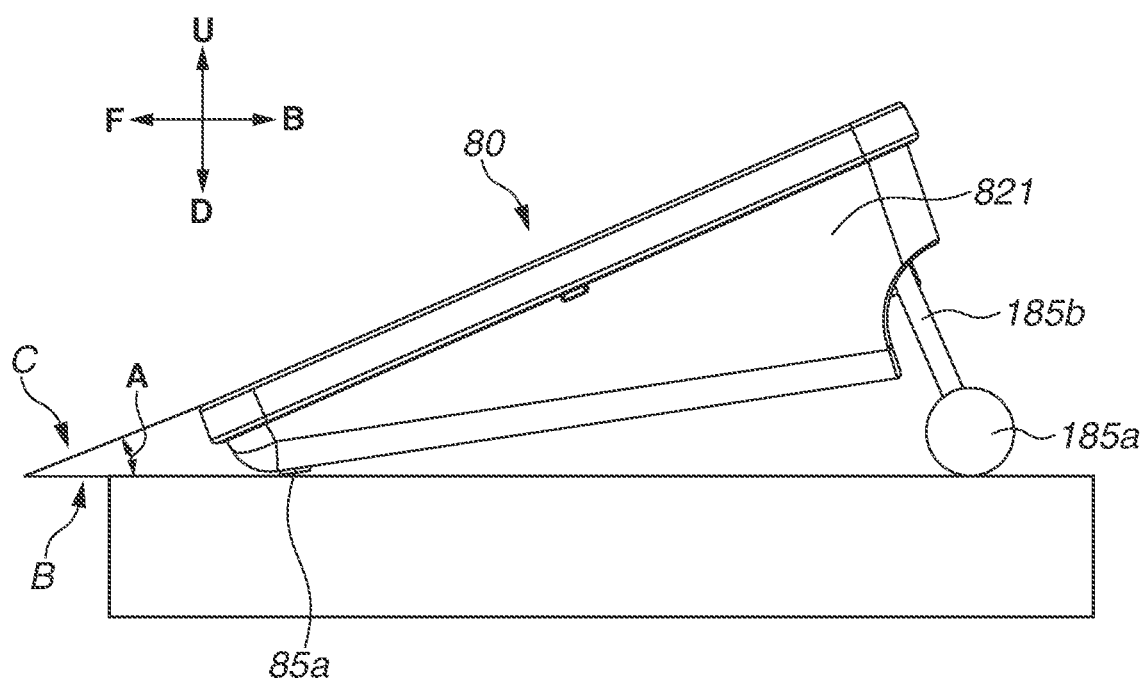
Figure 16A:
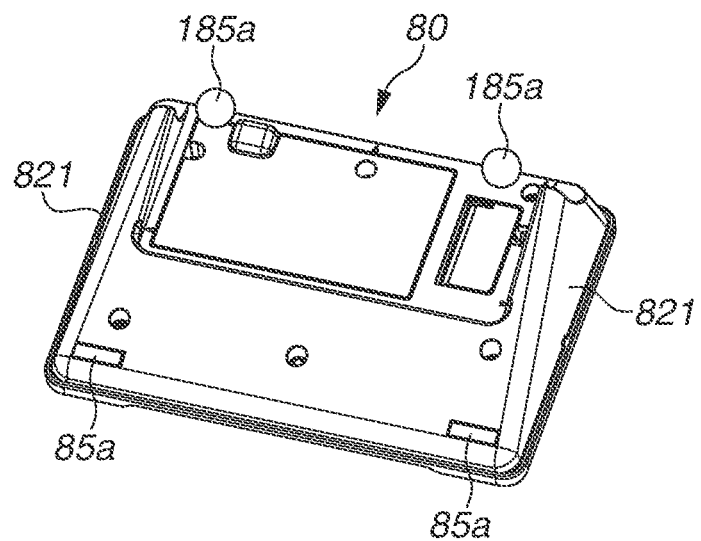
FIGS. 16A to 16C are diagrams schematically illustrating perspective views of the leg portion and the operation unit.
Figure 16B:
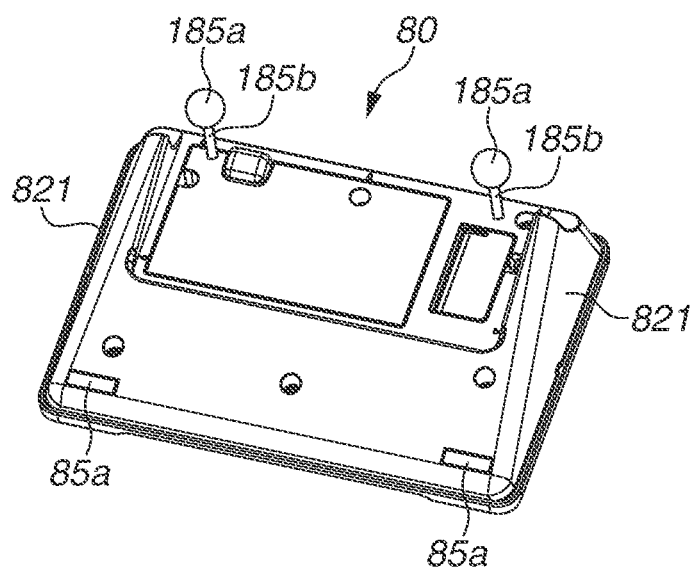

FIG. 15A is a side view of the operation unit 80 (at the operation unit angle A of 15 degrees) when the screw leg 185a is shortened. FIG. 15B is a side view of the operation unit 80 (at the operation unit angle A of 25 degrees) when the screw leg 185a is extended. FIG. 16A is a perspective view of the lower face side of the operation unit 80 when the screw leg 185a is shortened. FIG. 16B is a perspective view of the lower face side of the operation unit 80 when the screw leg 185a is extended.

As illustrated in FIG. 16B, the screw leg 185a is attached to the operation unit 80 via a screw portion 185b. Thus, as illustrated in FIGS. 16A and 16B, the screw leg 185a is attached to the operation unit 80 in an extendable state.

In the present exemplary embodiment, the angle can be steplessly adjusted by providing the screw leg 185a. Thus, the user can adjust the operation unit angle A to any angle at which the display panel 82 can be easily viewed.

However, in this mechanism, if the operation unit angle A is to be further increased, the screw portion 185b has to be longer. In this case, a storage portion (not illustrated) of the screw portion 185b when the screw leg 185a is shortened has to be housed within a space that is formed at the operation unit angle A of the operation unit 80 when the screw leg 185a is shortened.

Figure 16C:
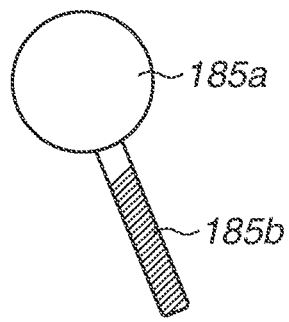

FIG. 16C is a schematic view of the screw leg 185a and the screw portion 185b. The screw leg 185a and the screw portion 185b are collectively referred to as a supporting member. As illustrated in FIG. 16C, a thread groove is formed on the screw portion 185b, and the screw portion 185b is screwed into a screw hole formed on a bottom portion of the operation unit 80. The user adjusts an amount of projection of the screw portion 185b from the operation unit 80 by holding and rotating the screw leg 185a to adjust a separation distance between the top face 109 and the bottom face of the operation unit 80.

Figure 17:
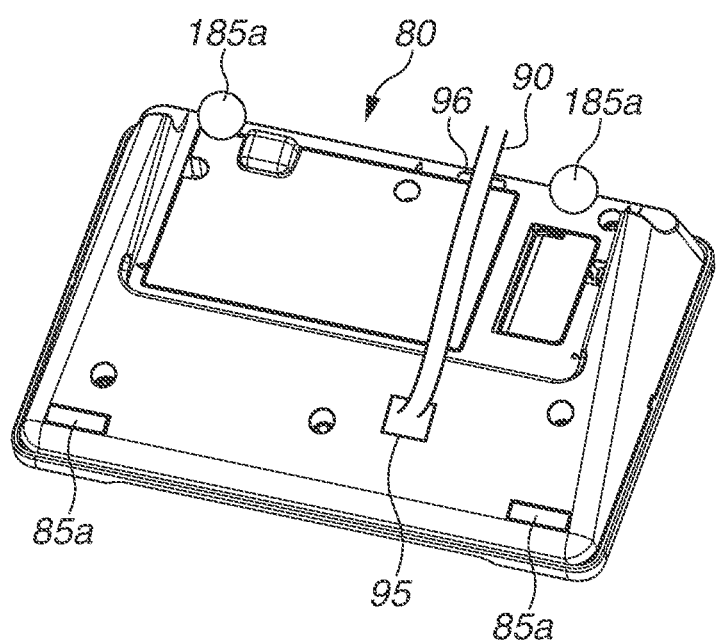
FIG. 17 is a diagram illustrating a state where a cable is led out from a lower face of the supporting base.

FIG. 17 is a diagram illustrating a configuration where a cable 90 is led out from a lower side (bottom face side) of the supporting base 821 in the vertical direction. As illustrated in FIG. 17, a lead out port 95 from which the cable 90 is led out to the outside of the operation unit 80 is formed on the bottom face side of the supporting base 821. Further, a clip member 96 is attached to the bottom face side of the supporting base 821 at a position on the depth side of the lead out port 95. Because the clip member 96 for the cable 90 is disposed on the depth side of the lead out port 95, the cable 90 is fixed to the supporting base 821 and extended toward a back side of the operation unit 80 from the lead out port 95.

<Numerical Value Input Unit>

Next, a numerical value input unit 861 will be described with reference to FIGS. 18A to 18D. The numerical value input unit 861 is an optional external unit that can be attached and detached upon user's request.

Figure 18A:
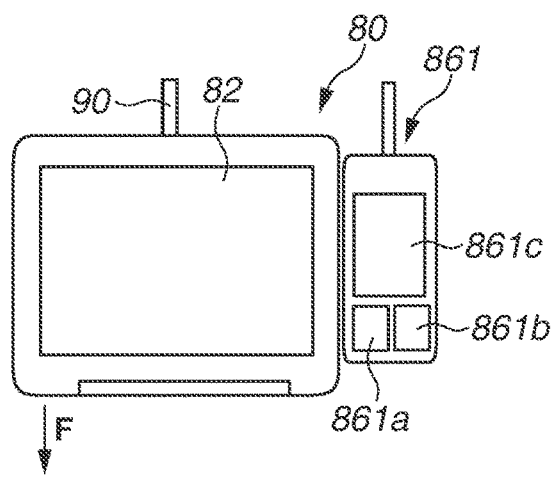
FIGS. 18A to 18D are diagrams illustrating a numerical value input unit as an optional apparatus.
Figure 18B:
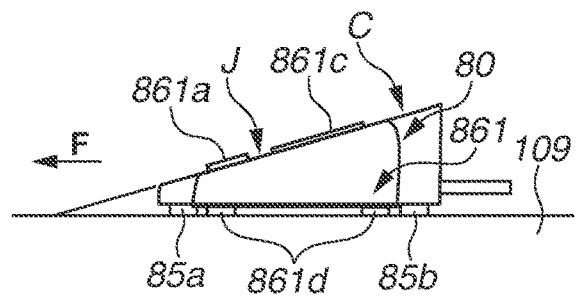
Figure 18C:
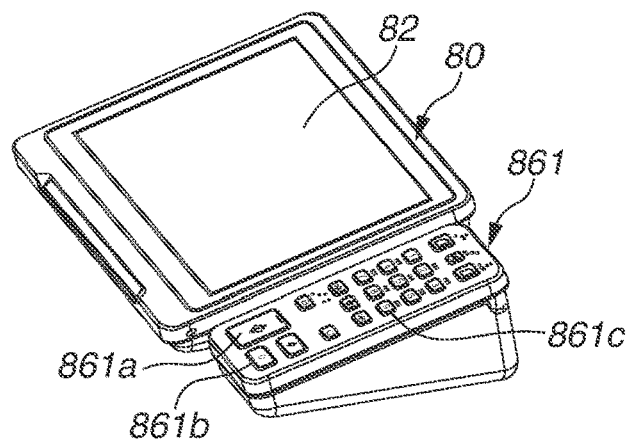
Figure 18D:
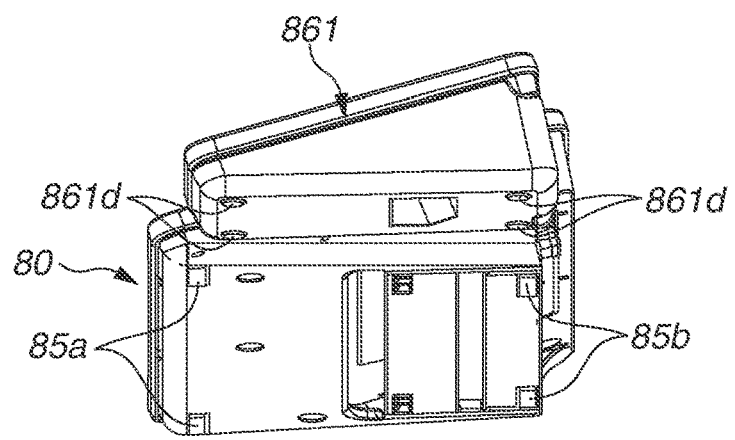

In the present exemplary embodiment, with reference to FIGS. 18A to 18D, the numerical value input unit 861 will be described as a hard key unit freely placed on the top face 109 in a similar way to the operation unit 80. FIG. 18A is a top face view, FIG. 18B is a right side face view, FIG. 18C is a perspective view of the top face, and FIG. 18D is a perspective view of a lower face.

The numerical value input unit 861 includes numerical keys 861c (examples of numerical keys), a start key 861a, and a stop key 861b, and the user operates the numerical value input unit 861 while viewing the display panel 82 of the operation unit 80. The numerical keys 861c are hardware keys for inputting numerical information of 0 to 9. These hardware keys are exposed from a frame 871. The numerical value input unit 861 is placed on the top face 109 via rubber feet 861d in a movable state.

Herein, in a state where an operation face J of the numerical value input unit 861 is positioned on a substantially right side of the display panel 82 of the operation unit 80, an operation face C of the operation unit 80 and the operation face J of the numerical value input unit 861 are aligned in a substantially same plane. The operation face J is a face parallel to the frame 871 positioned between the numerical keys 861c. With this configuration, when the user operates one of the numerical value input unit 861 and the display panel 82, the user is less likely to press a key of another unit, so that occurrence of erroneous operation can be reduced.

Specifically, in the present exemplary embodiment, because the user operates the numerical value input unit 861 while viewing the display of the operation unit 80, favorable operability can be obtained when the numerical value input unit 861 and the operation unit 80 are arranged close to each other. In a case where there is a difference in level of the surfaces of the operation unit 80 and the numerical value input unit 861, for the sake of preventing erroneous operation, the operation unit 80 and the numerical value input unit 861 have to be arranged at a distance. Thus, the operability will be degraded.

In the present exemplary embodiment, the numerical value input unit 861 is arranged on a right side of the operation unit 80. However, the numerical value input unit 861 can be arranged on a left side thereof. Thus, favorable operability can also be obtained for a left-handed user.

Further, user's operability can be improved by making the inclination angle of the frame 871 of the numerical value input unit 861 with respect to the top face 109 be slightly more moderate than the inclination angle of the display face 820 with respect to the top face 109. If the inclination angle of the frame 871 of the numerical value input unit 861 with respect to the top face 109 is steeper and higher than the inclination angle of the display face 820 with respect to the top face 109, the display face 820 may be hidden by the numerical value input unit 861 and cannot be viewed from a user standing next to the user who is operating the operation unit 80. By making the inclination angle of the frame 871 of the numerical value input unit 861 with respect to the top face 109 more moderate than the inclination angle of the display face 820 with respect to the top face 109, it is possible to reduce a risk of occurrence.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-045743, filed Mar. 16, 2020, which is hereby incorporated by reference herein in its entirety.

What is claimed is:

1. An image forming system comprising:
an image forming unit configured to execute an image formation on a sheet;
a housing including a sheet conveying unit configured to convey a sheet and a top face;
an operation unit including a body separated from the housing and a touch panel having a display on which information about the image formation is to be displayed and configured to accept touch operation;
a control circuit board configured to control the operation unit;
a cable connected to the control circuit board and the operation unit, and configured to transmit a signal between the operation unit and the control circuit board, wherein the operation unit is placeable at an arbitrary positon on the top face within a range corresponding to a length of the cable; and
a leg portion, provided on the operation unit, configured to support the operation unit onto the top face such that a surface of the display is inclined with respect to the top face, and configured to move in a predetermined direction with respect to the body,
wherein an inclination angle of the surface of the display inclined with respect to the top face is adjustable to a predetermined angle by the leg portion moving in the predetermined direction with respect to the operation unit.

2. The image forming system according to claim 1, further comprising four elastic members disposed on the operation unit and elastically deformed in a state where the operation unit is placed on the top face,
wherein, when the operation unit placed on the top face is viewed along a vertical direction, a center of gravity of the operation unit is positioned within an area surrounded by the four elastic members.

3. The image forming system according to claim 2,
wherein, when the operation unit is viewed along the vertical direction, a first elastic member included in the four elastic members and a second elastic member included in the four elastic members are arranged on a downstream side of the center of gravity, and a third elastic member included in the four elastic members and a fourth elastic member, member included in the four elastic members are arranged on an upstream side of the center of gravity, in an uphill direction of the inclination of the surface of the display inclined with respect to the top face, and
wherein the uphill direction is a direction that is perpendicular to both of (i) a direction that is perpendicular to the surface of the display and (ii) a width direction of the operation unit that is perpendicular to both of the direction that is perpendicular to the surface of the display and the vertical direction.

4. The image forming system according to claim 3, wherein the first elastic member is arranged on a side of one end of the operation unit in the width direction of the operation unit, and the second elastic member is arranged on a side of another end of the operation unit in the width direction of the operation unit.

5. The image forming system according to claim 1, further comprising:
a lead-out port through which the cable is led out, wherein the lead-out port is formed on a lower face of the operation unit in a vertical direction when the operation unit is placed on the top face; and
a clip member disposed on the operation unit and configured to clip the cable to the operation unit, wherein the clip member is disposed on a downstream side of the lead-out port in an uphill direction of the inclination of the surface of the display inclined with respect to the top face,
wherein the uphill direction is a direction that is perpendicular to both of (i) a direction that is perpendicular to the surface of the display and (ii) a width direction of the operation unit that is perpendicular to both of the direction that is perpendicular to the surface of the display and the vertical direction.

6. The image forming system according to claim 1, further comprising a lead-out port through which the cable is led out,
wherein the lead-out port is formed on a wall on a back side of the operation unit when the operation unit is viewed from an upstream side in an uphill direction, and
wherein the uphill direction is a direction that is perpendicular to both of (i) a direction that is perpendicular to the surface of the display and (ii) a width direction of the operation unit that is perpendicular to both of the direction that is perpendicular to the surface of the display and a vertical direction.

7. The image forming system according to claim 1, wherein the cable is a first cable, the image forming system further comprising:
an optional numerical value input unit configured to accept a user operation for inputting pieces of numerical information of 0 to 9, wherein the optional numerical value input unit includes a plurality of numerical keys, that (i) is hardware keys configured to receive inputs of respective pieces of the numerical information and (ii) is a frame configured to expose the plurality of numerical keys; and
a second cable connected to the control circuit board and the optional numerical value input unit, wherein the optional numerical value input unit is placeable at an arbitrary positon on the top face within a range corresponding to a length of the second cable,
wherein the inclination angle of the surface of the display inclined with respect to the top face is substantially the same as an angle formed by the top face and a face of the frame in an area between the plurality of numerical keys.

8. The image forming system according to claim 1, wherein the leg portion (i) is screwed into a screw hole formed on the operation unit, and (ii) is moved by rotating the leg portion.

9. The image forming system according to claim 1, wherein the predetermined angle is an arbitrary angle of 5 degrees or more and 45 degrees or less.

10. An image forming system comprising:
an image forming unit configured to execute an image formation on a sheet;
a housing including a sheet conveying unit configured to convey a sheet and a top face;
an operation unit including a body separated from the housing and a touch panel having a display on which information about the image formation is to be displayed and configured to accept touch operation;
a control circuit board configured to control the operation unit;
a cable connected to the control circuit board and the operation unit, and configured to transmit a signal between the operation unit and the control circuit board, wherein the operation unit is placeable at an arbitrary positon on the top face within a range corresponding to a length of the cable; and
an arm portion provided on the operation unit, configured to support the operation unit onto the top face such that a surface of the display is inclined with respect to the top face, and configured to be rotatable with respect to the body included in the operation unit,
wherein, in a state where a position of the arm portion is a first position, an inclination angle of the surface of the display inclined with respect to the top face in a state where the operation unit is placed on the top face is a first angle, and
wherein, in a state where the position of the arm portion is a second position, the inclination angle of the surface of the display inclined with respect to the top face in the state where the operation unit is placed on the top face is a second angle greater than the first angle.

11. The image forming system according to claim 10, further comprising four elastic members disposed on the operation unit and elastically deformed in the state where the operation unit is placed on the top face,
  wherein, when the operation unit placed on the top face is viewed along a vertical direction, a center of gravity of the operation unit is positioned within an area surrounded by the four elastic members.

12. The image forming system according to claim 11,
  wherein, when the operation unit is viewed along the vertical direction, a first elastic member included in the four elastic members and a second elastic member included in the four elastic members are arranged on a downstream side of the center of gravity, and a third elastic member included in the four elastic members and a fourth elastic member included in the four elastic members are arranged on an upstream side of the center of gravity, in an uphill direction of the inclination of the surface of the display inclined with respect to the top face, and
  wherein the uphill direction is a direction that is perpendicular to both of (i) a direction that is perpendicular to the surface of the display and (ii) a width direction of the operation unit that is perpendicular to both of the direction that is perpendicular to the surface of the display and the vertical direction.

13. The image forming system according to claim 12, wherein the first elastic member is arranged on a side of one end of the operation unit in the width direction of the operation unit, and the second elastic member is arranged on a side of another end of the operation unit in the width direction of the operation unit.

14. The image forming system according to claim 10, further comprising:
  a lead-out port through which the cable is led out, wherein the lead-out port is formed on a lower face of the operation unit in a vertical direction when the operation unit is placed on the top face; and
  a clip member disposed on the operation unit and configured to clip the cable to the operation unit,
  wherein the clip member is disposed on a downstream side of the lead-out port in an uphill direction of the inclination of the surface of the display inclined with respect to the top face,
  wherein the uphill direction is a direction that is perpendicular to both of (i) a direction that is perpendicular to the surface of the display and (ii) a width direction of the operation unit that is perpendicular to both of the direction that is perpendicular to the surface of the display and the vertical direction.

15. The image forming system according to claim 10, further comprising a lead-out port through which the cable is led out,
  wherein the lead-out port is formed on a wall on a back side of the operation unit when the operation unit is viewed from an upstream side in an uphill direction, and
  wherein the uphill direction is a direction that is perpendicular to both of (i) a direction that is perpendicular to the surface of the display and (ii) a width direction of the operation unit that is perpendicular to both of the direction that is perpendicular to the surface of the display and a vertical direction.

16. The image forming system according to claim 10, wherein the cable is a first cable, the image forming system further comprising:
  an optional numerical value input unit configured to accept a user operation for inputting pieces of numerical information of 0 to 9, wherein the optional numerical value input unit includes a plurality of numerical keys that (i) is hardware keys configured to receive inputs of respective pieces of the numerical information and (ii) is a frame configured to expose the plurality of numerical keys; and
  a second cable connected to the control circuit board and the optional numerical value input unit, wherein the optional numerical value input unit is placeable at an arbitrary positon on the top face within a range corresponding to a length of the second cable,
  wherein the inclination angle of the surface of the display inclined with respect to the top face is substantially the same as an angle formed by the top face and a face of the frame in an area between the plurality of numerical keys.

17. The image forming system according to claim 10 wherein the operation unit includes a storage unit configured to store the arm portion,
  wherein the arm portion includes elastic members that are elastically-deformable and are arranged on a side of one end of the arm portion and a side of the other end of the arm portion in a width direction of the operation unit, and the arm portion is configured to rotate with a rotary shaft arranged on a downstream side of a center of gravity of the operation unit as a rotation center, in an uphill direction of the inclination of the surface of the display inclined with respect to the top face,
  wherein the uphill direction is a direction that is perpendicular to both of (i) a direction that is perpendicular to the surface of the display and (ii) a width direction of the operation unit that is perpendicular to both of the direction that is perpendicular to the surface of the display and a vertical direction, and
  wherein, in the state where a position of the arm portion is the first position, a leading end of the arm portion is positioned inside the storage unit.

* * * * *